United States Patent
McCrory et al.

(10) Patent No.: US 7,529,867 B2
(45) Date of Patent: May 5, 2009

(54) ADAPTIVE, SCALABLE I/O REQUEST HANDLING ARCHITECTURE IN VIRTUALIZED COMPUTER SYSTEMS AND NETWORKS

(75) Inventors: Dave Dennis McCrory, Pflugerville, TX (US); John Edward Kellar, Austin, TX (US)

(73) Assignee: Inovawave, Inc., Austin, TX (US)

( * ) Notice: Subject to any disclaimer, the term of this patent is extended or adjusted under 35 U.S.C. 154(b) by 180 days.

(21) Appl. No.: 11/739,460

(22) Filed: Apr. 24, 2007

(65) Prior Publication Data

US 2008/0104591 A1    May 1, 2008

Related U.S. Application Data

(60) Provisional application No. 60/863,872, filed on Nov. 1, 2006, provisional application No. 60/867,656, filed on Nov. 29, 2006, now abandoned.

(51) Int. Cl.
*G06F 3/00* (2006.01)
*G06F 13/36* (2006.01)

(52) U.S. Cl. .................... 710/52; 710/29; 710/310; 370/235

(58) Field of Classification Search ................ 710/29, 710/33–35, 52–57, 310; 370/235
See application file for complete search history.

(56) References Cited

U.S. PATENT DOCUMENTS

| | | | |
|---|---|---|---|
| 6,523,102 B1 | 2/2003 | Dye et al. | |
| 7,165,131 B2 * | 1/2007 | Creta et al. | 710/100 |
| 7,437,404 B2 * | 10/2008 | Shen | 709/202 |
| 2001/0055277 A1 * | 12/2001 | Steely et al. | 370/236 |
| 2002/0146022 A1 * | 10/2002 | Van Doren et al. | 370/412 |
| 2004/0037313 A1 * | 2/2004 | Gulati et al. | 370/465 |
| 2005/0223005 A1 | 10/2005 | Shultz et al. | |
| 2005/0261796 A1 * | 11/2005 | Shen | 700/121 |
| 2006/0101178 A1 * | 5/2006 | Zhong et al. | 710/112 |
| 2006/0136667 A1 | 6/2006 | Shultz et al. | |
| 2006/0143360 A1 | 6/2006 | Petev et al. | |
| 2006/0146787 A1 * | 7/2006 | Wijnands et al. | 370/352 |
| 2006/0155667 A1 | 7/2006 | Tolba | |
| 2006/0259734 A1 | 11/2006 | Sheu et al. | |
| 2007/0005901 A1 | 1/2007 | Kellar | |
| 2007/0050763 A1 | 3/2007 | Kagan et al. | |
| 2008/0104591 A1 * | 5/2008 | McCrory et al. | 718/1 |

* cited by examiner

*Primary Examiner*—Christopher B Shin
(74) *Attorney, Agent, or Firm*—Dillon & Yudell LLP

(57) ABSTRACT

A system and method for processing input/output (I/O) requests in a virtualized computer system. I/O requests are received from a virtual machine. A set of virtual I/O channels that may be interfaced with a host I/O stack and/or a virtual machine I/O stack adaptively queues requested data using a variety of I/O queue management modules. In one embodiment, the virtual I/O channels include an entropy detection module and a queue storage. The entropy detection module determines an entropy value of specified I/O request data and encodes the specified I/O request data with the entropy value within the queue storage.

20 Claims, 16 Drawing Sheets

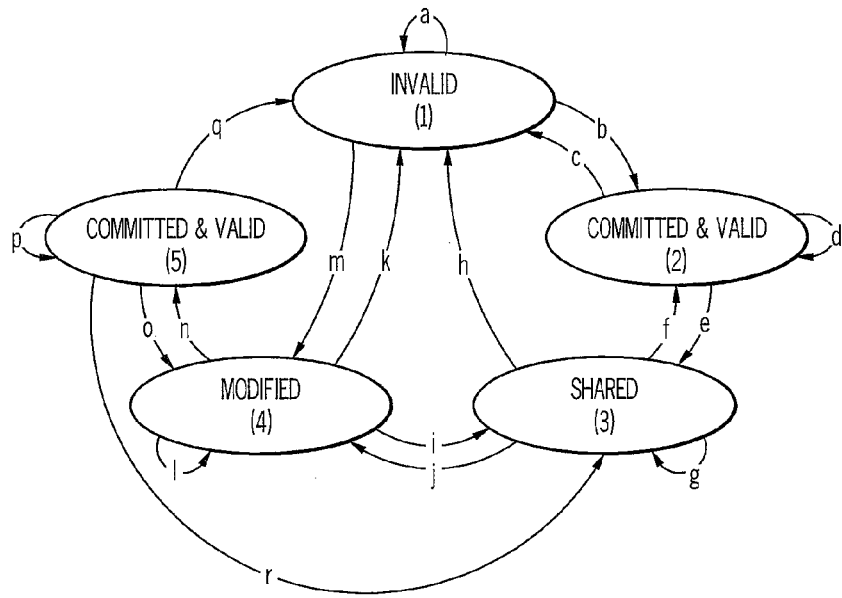

| | READ | WRITE | FLUSH | INVALIDATE |
|---|---|---|---|---|
| INVALID | d, SHARED | a, MODIFIED | NA | NA |
| SHARED | d, SHARED | a, MODIFIED | e, SHARED | c, INVALID |
| MODIFIED | d, MODIFIED | a, MODIFIED | g, SHARED | b, INVALID |

| | READ | WRITE | FLUSH | INVALIDATE |
|---|---|---|---|---|
| INVALID | SHARED IF NC, INVALID | INVALID IF AOW & WB, MODIFIED IF AOW & WT, SHARED | INVALID | INVALID |
| COMMITTED & INVALID | CI, REQUEST IS QUEUED AND COMPLETED WHEN I/O IS COMPLETE | MODIFIED SUBSEQUENT I/O COMPLETION IS CANCELLED/ IGNORED | CI | INVALID |
| COMMITTED & INVALID | SHARED, IF NC, SHARED & INCREMENT INVALID STATE CTR | WB: MODIFIED WT: SHARED | SHARED | INVALID |
| MODIFIED | MODIFIED, IF NC, MODIFIED & INCREMENT INVALID STATE CTR | MODIFIED | C&M | INVALID |
| COMMITTED & VALID | C&V IF NC, C&V & INCREMENT INVALID STATE CTR | C&V: WRITE UPDATE IS REISSUED | SHARED | INVALID |

*FIG. 16*

ADAPTIVE, SCALABLE I/O REQUEST HANDLING ARCHITECTURE IN VIRTUALIZED COMPUTER SYSTEMS AND NETWORKS

CROSS-REFERENCE TO RELATED APPLICATIONS

The present application is related to and claims the priority date benefit of U.S. Provisional Application No. 60/863,872, filed Nov. 1, 2006, titled "QUEUE SYSTEM MANAGEMENT IN VIRTUALIZED ARCHITECTURE", and U.S. Provisional Application No. 60/867,656, filed Nov. 29, 2006, now abandoned titled "ADAPTIVE SYSTEM VIRTUAHZED INPUT/OUTPUT AND METHOD FOR USING SAME." The above-mentioned patent applications are incorporated herein by reference.

The present application is also related to the following U.S. patent applications filed concurrently herewith: U.S. patent application Ser. No. 11/739,426 filed on Apr. 24, 2007, titled "ADAPTIVE, SCALABLE I/O REQUEST HANDLING ARCHITECTURE IN VIRTUALIZED COMPUTER SYSTEMS AND NETWORKS"; and U.S. patent application Ser. No. 11/739,447 filed on Apr. 24, 2007, titled "ADAPTIVE, SCALABLE I/O REQUEST HANDLING ARCHITECTURE IN VIRTUALIZED COMPUTER SYSTEMS AND NETWORKS." The above-mentioned patent applications are assigned to the assignee of the present invention and are incorporated herein by reference.

BACKGROUND OF THE INVENTION

1. Technical Field

The present invention relates generally to managing I/O resources in a virtualized computer system, and in particular to an I/O request processing architecture implemented in a virtualized computing environment.

2. Description of the Related Art

Logical partitioning of computer resources allows the establishment of multiple system images on a single physical machine or processor complex. Virtualization is a term designating system imaging in which each system image, known also as a virtual machine (VM), operates in a logically independent manner from the other VMs using logically partitioned resources of the physical computer system. In this manner, each logical partition corresponding to a VM can be independently reset, loaded with an operating system that may be different for each VM, and operate with different software programs using different input/output (I/O) devices. Platform virtualization, or simply "virtualization," is a process or technique that presents a hardware platform to a VM.

Advances in computer system technology relating to high-capacity storage and access applications has resulted in increased platform specialization and performance. Such advances have also lead to a proliferation of specialized systems in high-capacity server implementations such as utilized for data centers. The physical system resources required to support high-capacity data centers are costly in terms of power consumption and other environmental loading, IT management issues such as storage management and physical server management complications. Virtualization addresses these issues by allowing physical platforms to be shared by multiple, disparate, discrete applications. Virtualization of the physical server platform, CPU, memory, and I/O sub-systems has therefore become standard in high-capacity data processing systems.

Sharing of physical system resources often results in over-subscription by the multiple virtualized entities which may contribute to an underutilization of the underlying physical system resources. In particular, virtualization often causes an over-subscription of the I/O sub-systems by the supported VMs, resulting in degraded per-VM and system-wide throughput performance as well as decreased scale-out capability of the host platform in spite of increased host platform physical resource capacity. Symptoms of I/O over-subscription include lower processor utilization by applications with sluggish response time and high latencies. These symptoms are attributable to increased I/O request processing path length which compounds the I/O bottleneck resulting from the shared I/O access architecture of the host system.

In prior systems, I/O over-subscription has been managed through increased concurrency by adding additional physical storage devices and increasing shared accessibility thereto through the use of multi-channel controllers. Additional I/O access improvement measures such as may be employed by Storage-Array-Networking (SAN) systems include increases in storage density, increases in rotational speed of storage devices, and/or increases in I/O channel bandwidth and multiple channels with caching. While these techniques have marginally kept pace with the growing demand for improved VM application performance on physical platforms, platform virtualization introduces several design and performance issues that are presently inadequately addressed by conventional I/O architectures.

It can therefore be appreciated that a need exists for I/O request handling systems and methods that address the issues presented by platform virtualization. The present invention addresses this and other needs unresolved by the prior art.

SUMMARY OF THE INVENTION

A system and method for processing input/output (I/O) requests in a virtualized computer system are disclosed herein. I/O requests are received from a virtual machine. A set of virtual I/O channels that may be interfaced with a host I/O stack and/or a virtual machine I/O stack adaptively queues requested data using a variety of I/O queue management modules. In one embodiment, the virtual I/O channels include an entropy detection module and a queue storage. The entropy detection module determines an entropy value of specified I/O request data and encodes the specified I/O request data with the entropy value within the queue storage.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 16 is a state diagram of a modified MSI protocol for maintaining data block coherency across data I/O queues according to an embodiment.

DETAILED DESCRIPTION OF ILLUSTRATIVE EMBODIMENT(S)

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features disclosed herein.

The systems and methods disclosed herein enable more efficient input/output (I/O) resource allocation within or on behalf of a virtualized computing environment. In one aspect, a set of virtual I/O channels (VIOCs) map views of one or more virtual hard drives (VHDs) into memory. The virtual I/O channels access active portions of VHDs which are mapped into memory using static entitlement allocation policies and/ or dynamically adaptive rules disclosed herein. In another aspect, the data comprising the currently in-use mapped view is encoded in a manner enabling bloat-free, lossless compression to further improve physical memory utilization.

In another aspect, the establishment and size of I/O queues within the VIOCs are based on policies designed to minimize I/O access latency. The I/O queues can be sorted by the logically consecutive disk block address of the VHDs, and may be as large as the size of the disk/volume or partition that a VHD resides on. The I/O queues are managed by a sparse global hash table that maps a view of all the logically addressable disk blocks included by the VHD without requiring that all of these blocks reside in main memory. As each block is addressed, a corresponding I/O queue is populated with entropy encoded data blocks that may or may not be compressed.

Figure 1A:
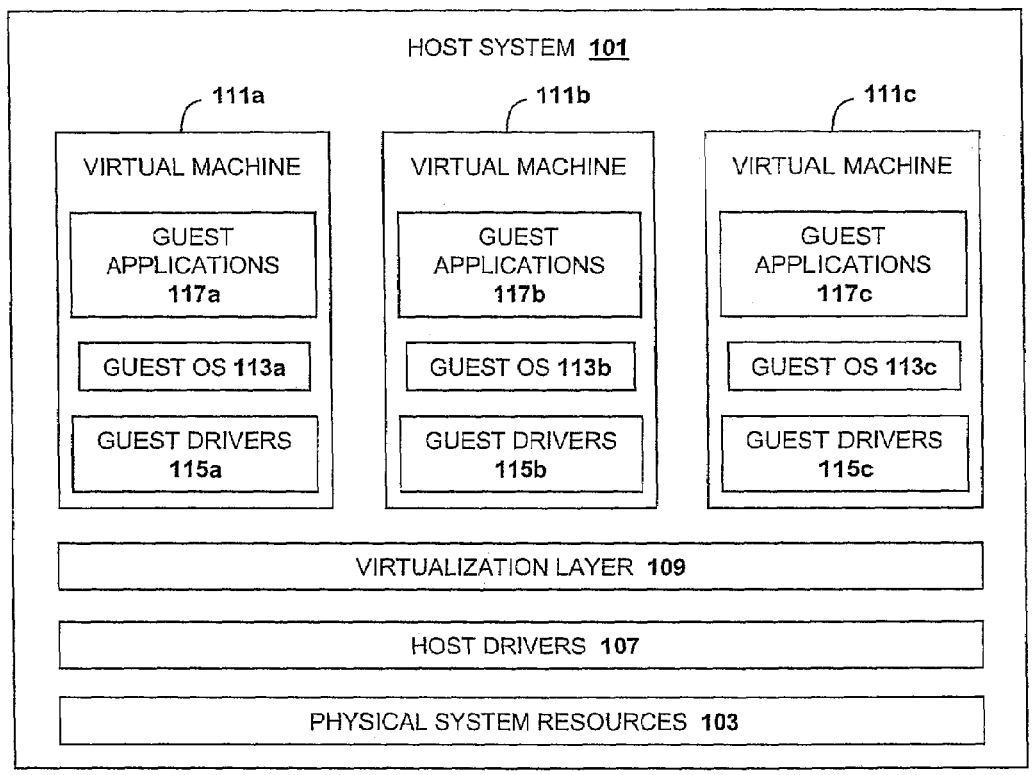
FIG. 1A is a block diagram of an exemplary architecture of a virtualized computer system as known in the prior art.

With reference now to the figures, wherein like reference numerals refer to like and corresponding parts throughout, one embodiment of a virtualized computing environment that may be adapted to implement the virtual I/O management features of the present invention is depicted in FIG. 1A. A virtualized host computer system 101 is illustrated featuring platform virtualization in the form of multiple virtual machines (VMs) 111a-111c. VMs 111a-111c operate as logically discrete units, sometimes referred to as "guests" or "guest domains," that are provided substantially identical execution environments on host system 101. Within their respective domains, VMs 111a-111c include their own guest operating systems 113a-113c which in some respects define and differentiate the guest domains. The guest domains of VMs 111a-111c further include respective guest applications 117a-117c and guest drivers 115a-115c that are handled and managed privately by each of the respective guest OSs 113a-113c.

The logical isolation between VMs 111a-111c is provided by a virtualization layer 109, which is a part of the host software. Virtualization layer 109 includes a virtual switching mechanism having isolation and load balancing functions. As depicted and explained in further detail below, the virtual switching mechanism implemented by virtualization layer 109 may be embodied as a virtual machine monitor (VMM) and host OS, or alternately may be a hypervisor. Examples of virtualization types include VMware ESX server, VMware server, Microsoft Virtual Server, and Xen. Regardless of the particular platform implementation, virtualization architectures such as that depicted in FIG. 1A provide execution environments having qualitatively greater isolation between processes than may be achieved when coordinating multiple processes on the same instance of an OS.

The virtualization of host computer system 101 enables each of multiple users (i.e., VMs) to access a complete and private computer system from a shared set of host drivers 107 and physical system resources 103. Such sharing of host resources has many advantages including increased flexibility in physical resource allocation resulting in greater net physical resource utilization. Another advantage is that VMs 111a-111c can be brought online (e.g. booted or otherwise restarted) much faster and with less system resource utilization than on a dedicated physical machine platform in which many more hardware and software initialization tasks are required for startup.

Figure 1B:
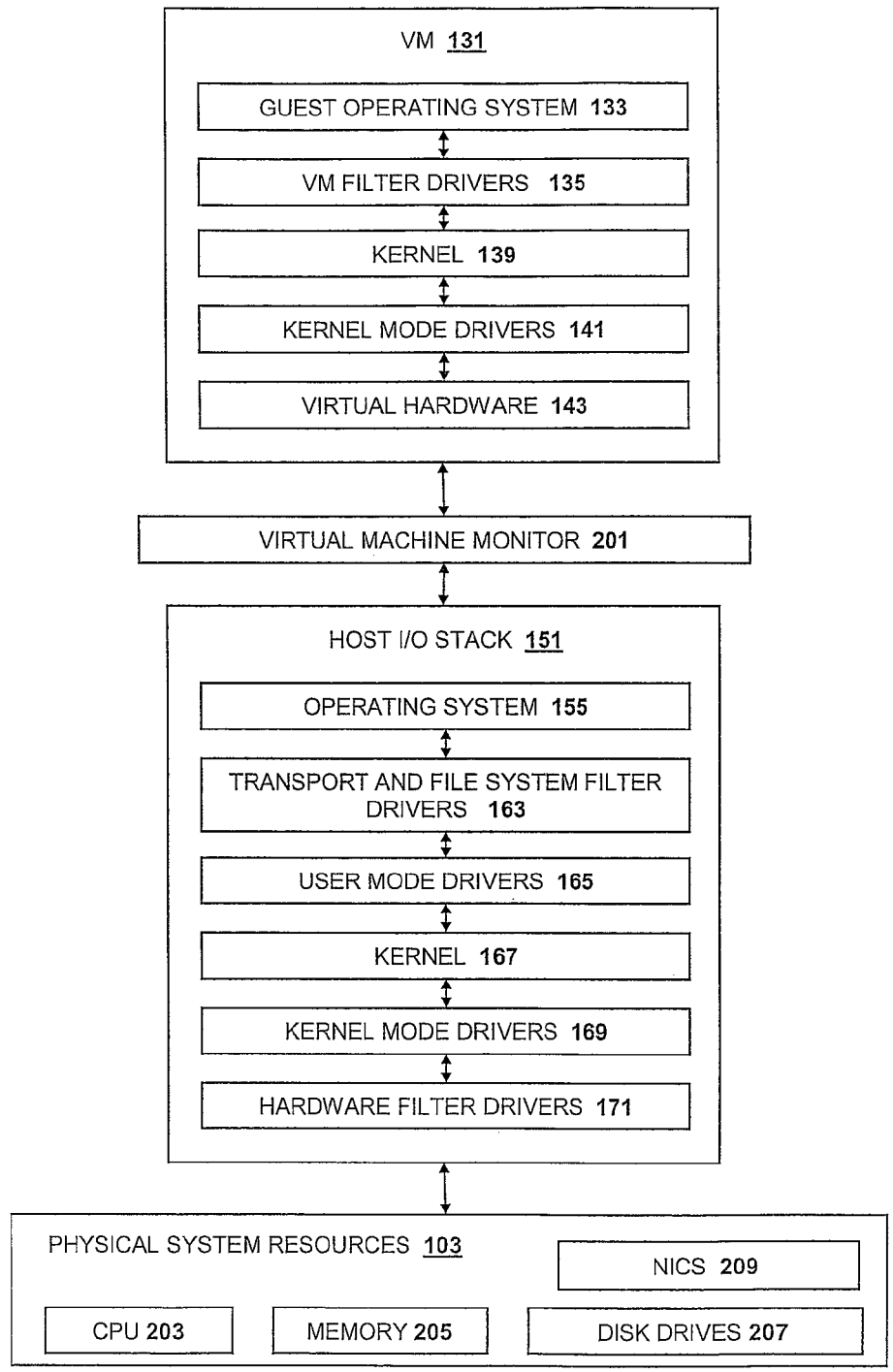
FIG. 1B is a block diagram showing I/O request handling implemented on a virtualized computer system.

FIG. 1B is a block diagram of an exemplary I/O request processing architecture of a virtualized computer system. The depicted I/O request processing architecture includes a host side comprising a host I/O stack 151 and physical system resources 103. A virtual machine monitor (VMM) 201 and a host OS 155 provide the virtualization or abstraction layer illustrated as virtualization layer 109 in FIG. 1 between host I/O stack 151 and a VM 131. VMM 201 can be an application of host OS 155, which together with host OS 155 forms a software abstraction layer between the host system and VM 131. Host OS 155 may be any of a variety of known operating systems suitable for performing a host OS function, such as AIX® or Windows 2003®.

Host I/O stack 151 processes I/O requests received from VMM 201 using a specified layered protocol defined by the layers depicted within the stack. The stack layered I/O request processing enables the request to ultimately be handled by hardware within physical system resources 103. Host I/O stack 151 includes host OS 155 interfacing transport and filesystem filter drivers 163, which interface user mode drivers 165. Within transport and filesystem filter drivers 163, filesystem filter drivers generally maintain the on-disk structures utilized by various filesystems, while transport filter drivers implement specific network protocols required for processing network I/O traffic. The filter drivers 163 intercept I/O requests passed from host OS 155. By intercepting the request before it reaches its intended target, filter drivers 163 can extend or replace functionality provided by the original target of a given request or otherwise modify the request.

User mode drivers 165 interface a host kernel 167 which provides mechanisms for interrupt and exception handling, thread scheduling and synchronization, multiprocessor synchronization, and timekeeping. Kernel 167 interfaces with a set of kernel mode drivers 169, which in turn interface with hardware filter drivers 171. Hardware filter drivers 171 are lower-level device filter drivers that monitor and/or modify I/O requests in accordance with a particular class of physical devices (e.g., hard disk storage) within physical system resources 103. These filters are typically utilized to redefine hardware behavior to match expected specifications. Host kernel mode drivers 169 in conjunction with hardware filter drivers 171 provide the interface to the hardware within physical system resources 103.

Physical system resources 103 comprise host hardware and associated resources including a central processing unit (CPU) 203, memory 205, disk drives 207, and network interface cards 209. CPU 203 may be a multiprocessor or any other suitable processor design or configuration. Memory 205 represents data storage generally characterized in the art as "main memory" and associated levels of cache memory, and is typically implemented as a form of random access memory (RAM). Network cards 209 may incorporate one or more communication interfaces as further described below.

Disk drives 207 include any suitable type of substantially permanent data storage media such as disks arrays used in large scale storage applications. In virtualized systems as illustrated in FIGS. 1A and 1B, data storage media such as disk drives 207 provide the persistent storage to maintain the logical and data definitions of each of the resident VMs as file data structures referred to herein as virtual hard drives (VHDs). It should be noted that as represented herein, disk drives 207 may be representative of various storage embodiments for persistent storing the VHD data from which VMs are generated. Such embodiments include, without particular limitation, direct attached storage such as Small Computer System Interface (SCSI) arrays as well as storage area networks (SANs), which use host bus adapters. Disk drives 207 may further be representative of network attached storage (NAS) interfaced over a network connection as well as solid state disks or solid state memory systems, Universal Serial Bus (USB) memory sticks or flash drives, or DVD/CD read/write devices.

VMM 201 is installed as an application of host OS 155, and effectively forms a software abstraction layer between the physical host system resources and VM 131. VM 131 comprises a layered I/O processing stack of functions similar to that host I/O stack 151. In particular, VM 131 includes a guest OS 133 interfacing VM filter drivers 135, which interface a VM kernel 139, which further interfaces VM kernel mode drivers 141. VM kernel mode drivers 141 further interface virtual hardware 143 at the bottom of the VM I/O stack.

In a conventional configuration, a file or data I/O request (e.g., read/write/modify) generated by the VM guest OS 133 is passed to VM filter drivers 135, which pass the request to VM kernel mode drivers 141 via VM kernel 139. VM kernel mode drivers 141 pass the I/O request to the virtual hardware 143.

Having been processed through the VM I/O stack, the I/O request is passed down to host I/O stack 151 via the virtual switching function of VMM 201. Host OS 155 passes the I/O request to transport and filesystem filter drivers 163, which pass the request to user mode drivers 165 and finally to host kernel mode drivers 169 via host kernel 167. Host kernel mode drivers 169 in conjunction with hardware filter drivers 171 interface the logically partitioned physical system resources 103 to service the request. A response to the request, such as the data requested in a read I/O request, is then passed all the way back up, layer by layer, to the originator of the request, such as VM guest OS 133. For a data read, for example, data may be read from memory 205 or disk drives 207 and returned to host kernel drivers 169. The data is passed all the way back up host I/O stack 151, layer by layer, to VMM 201. VMM 201 forwards the data to the virtual hardware 143, which passes the data through the layers of the VM I/O stack back to guest OS 133.

The dual stack request and response path illustrated in FIG. 1B results in a significant throughput bottleneck and corresponding performance degradation in conventional virtualized systems. The bottleneck is caused in part by the dual I/O stack processing paradigm of the virtualized system in which CPU 203 handles interrupt requests at each level of both stacks and also by the additional path length of the object code required to process an I/O request. The bottleneck scales with the number of VMs implemented and active on the host system.

Figure 2:
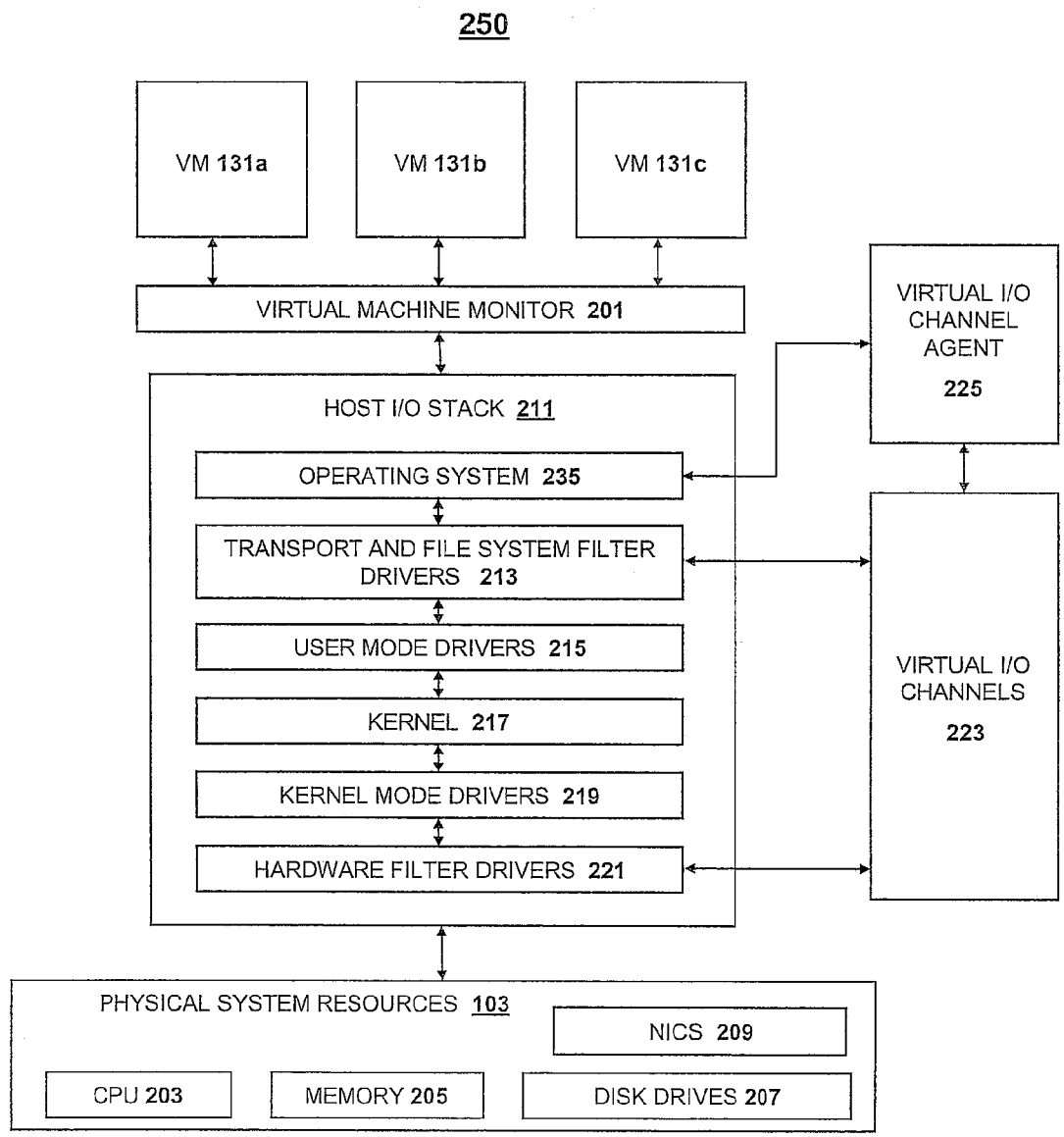
FIG. 2 is a block diagram of an exemplary architecture of a virtualized computer system implemented according to one embodiment.

FIG. 2 illustrates a virtualized computer system 250 including components and features for accelerating access to I/O data and otherwise addressing the I/O request bottleneck depicted and explained with reference to FIG. 1B. As shown in FIG. 2, system 250 comprises VMM 201, which in conjunction with a host OS 235, forms the virtualization layer between the host system components and a set of VMs 131a-131c. The depicted host-side components include a host I/O stack 211 and physical system resources 103 described with reference to FIG. 1B. As shown in FIG. 2 host I/O stack 211 includes host OS 235, which in turn comprises transport and filesystem filter drivers 213, user mode drivers 215, a kernel 217, kernel mode drivers 219, and hardware filter drivers 221 performing similar interfacing functions as those of the stack layers described with reference to FIG. 1B.

In accordance with conventional I/O processing, an I/O request (e.g., read/write/modify) generated by a VM 131 is passed to VMM 201 through a VM I/O processing stack implemented by a guest OS and guest drivers such as in the manner shown in FIG. 1B. Following the VM I/O stack processing of the I/O request, the VM stack encapsulated request is passed from VMM 201 to host I/O stack 211 where it is processed by the aforementioned driver and kernel layers and is ultimately serviced by appropriate physical system resources 103. Depending on the I/O request, a response may be required which is then passed all the way back up, layer by layer, to the originator of the request, such as any one of VMs 131a-131c.

To improve I/O throughput and overall system performance, virtualized computer system 250 further comprises an adaptive I/O data handling mechanism embodied in FIG. 2 as host-level virtual I/O channels (VIOCs) 223 and a host-level VIOC agent 225. As explained in further detail below, VIOCs 223 includes physical memory resources as well as logic and program modules, instructions, and other data structures for performing I/O request processing management in a manner accelerating access to VM I/O data and generally improving per-VM and system-wide I/O data throughput. In the depicted embodiment, VIOCs 223 interface with transport and filesystem filter drivers 213 and hardware filter drivers 221 while VIOC agent 225 interfaces with VIOCs 223 as well as host OS 235.

Figure 4:
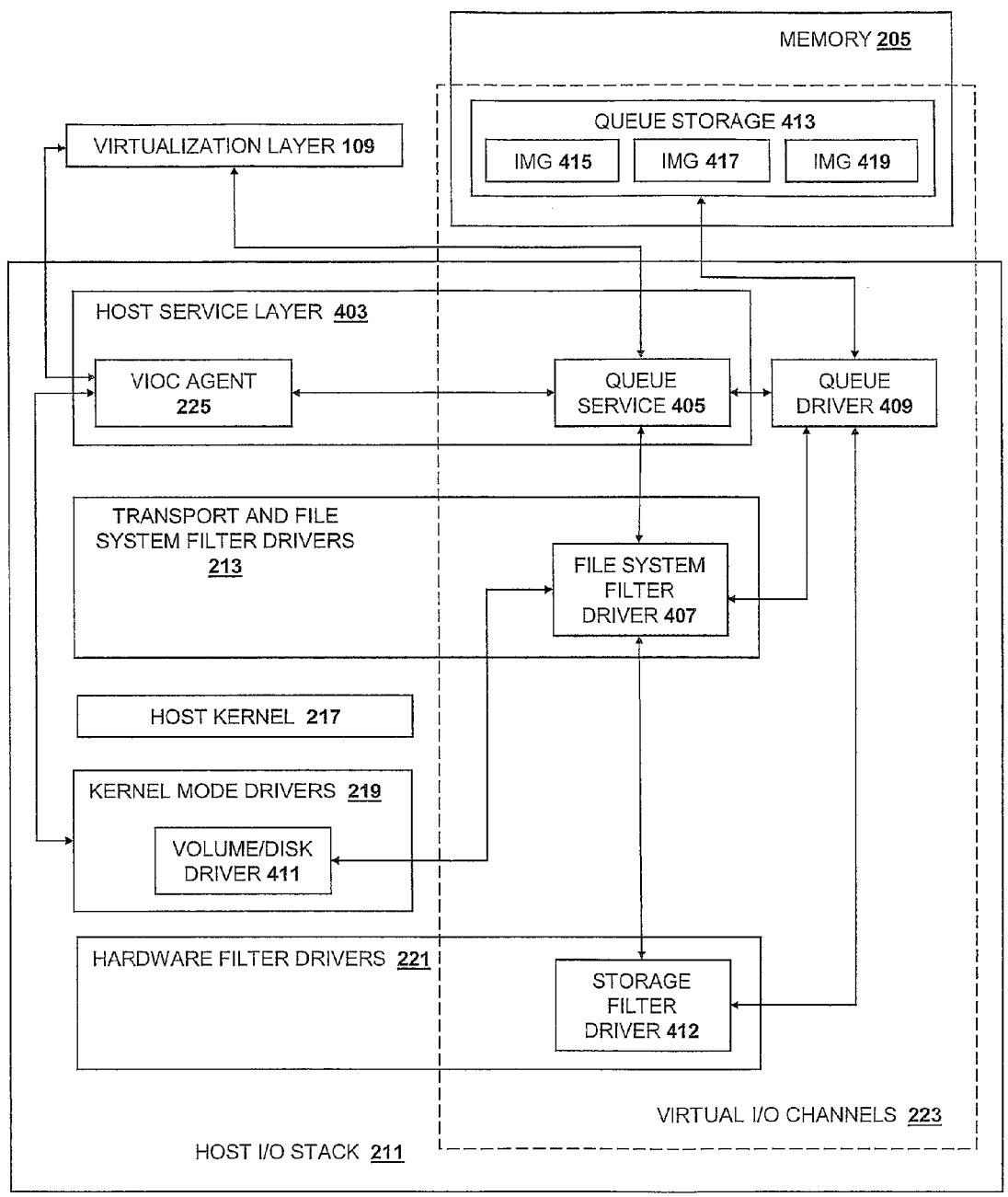
FIG. 4 is a block diagram depicting the interface between host-level virtual I/O channels and a host I/O processing stack.

FIG. 4 is a more detailed block diagram illustrating an embodiment of the interfacing of VIOCs 223 and VIOC agent 225 with host I/O stack 211. As shown in FIG. 4, VIOCs 223 generally comprise a queue storage 413 that provides physical storage for data collected and managed using the techniques described herein. VIOCs 223 further comprise management components and modules for implementing the collection and management of the stored queue data. In the depicted embodiment, queue storage 413 comprises a sub-portion of available physical memory 205. The queue management components of VIOCs 223 generally comprise a queue driver 409, a queue service 405, a filesystem filter driver 407 incorporated within filter drivers 213, and a storage filter driver 412 within hardware filter drivers 221.

Queue service 405 is included within a service layer 403, which is a sub-function of host OS 235 in the upper portion of host I/O stack 211. Queue driver 409 logically interfaces queue service 405, filesystem filter driver 407, and storage filter driver 412. Queue driver 409 manages data structures within queue storage 413 in accordance with information received from the filter drivers and other modules.

As shown in FIG. 4, queue storage 413 contains one or more VHD image files 415, 417, 419 each comprising one or more block addressable I/O queues which are depicted and explained in further detail below with reference to FIGS. 5A and 5B. The queues making up image files 415, 417, and 419 are adaptively managed by queue driver 409 using a variety of metrics, statistics, and other data relating to I/O channeling. In one embodiment, queue driver 409 generates VHD image files 415, 417, and 419 in a manner establishing multiple virtual I/O channels that may be dedicated or shared for data access by local or networked VMs delivering VM I/O requests to host I/O stack 211.

Filesystem filter driver 407 logically interfaces queue service 405, storage filter driver 412 as well as queue driver 409. Filesystem filter driver 407 communicates with queue service 405 using variations of standard process calls utilized in the service-to-driver interface. I/O request data (e.g. read or write data) may be transferred directly between queue driver 409 and a volume/disk driver 411 as controlled by I/O request processing by filesystem filter driver 407.

In operation, a VM stack encapsulated I/O request received by service layer 403, such as from VMs 131 or as a network I/O request packet (IRP) from virtualization layer 109, is initially detected within host I/O stack 211 by queue service 405. Queue service 405 forwards the request to filesystem filter driver 407 which queries queue driver 409 to determine whether VIOCs 223 contain the requested data. To this end, filesystem filter driver 407 examines the I/O request and queries queue driver 409 to determine whether the requested data is contained in or otherwise logically accessible from queue storage 413. If VIOCs 223 are not able to service the request, a queue miss results and filesystem filter driver 407 forwards the request to a volume/disk driver 411. If, for example, the queue miss is a read miss, volume/disk driver 411 retrieves the data from disk drives and returns the data to filesystem filter driver 407 which forwards the retrieved data to queue service 405. Queue service 405 forwards the retrieved data to the requesting entity such as via virtualization layer 109. Depending on the configuration, volume/disk driver 411 or filesystem filter driver 407 also provides the retrieved data to queue driver 409, which stores the retrieved data within queue storage 413 in accordance with queue management policy explained in further detail below.

If, as determined by filesystem filter driver 407 and queue driver 409, VIOCs 223 are able to service the request, queue driver 409 handles the request using address and data information stored within queue storage 413 as depicted and explained in further detail below.

FIG. 4 depicts VIOC agent 225 as an agent service incorporated within host OS service layer 403. While depicted in FIG. 4 as a distinct logical module for illustrative purposes, VIOC agent 225 may be incorporated in part or entirely within queue driver 409. VIOC agent 225 detects and tracks processor utilization and memory utilization via the usage of VIOCs 223 in association with VMs. To this end, VIOC agent 225 interfaces queue driver 409 via queue service 405 as well as interfacing kernel mode driver 219 to obtain system metrics relating to processor and memory utilization, available physical resource bandwidth and other metrics relating to I/O processing. Such metrics and statistics preferably include compression ratios within queue storage 413, size and rate of change of consumed memory space within queue storage 413, number and ratio of I/O queue hits and misses, as well as processor/logical partition utilization metrics that may be obtained from virtualization layer 109 or hardware drivers and controllers. Such metrics further include physical volume/disk storage configuration including the number of spindles, redundant array of independent disks (RAID) type, bus type (e.g., USB, PCI, PCI-X), physical storage controller configuration (e.g., SCSI device, controller cache capacity, READ/WRITE caching allocation, etc.). VIOC agent 225 uses the statistics and utilization data to make decisions regarding the status and operation of VIOCs 223. For example, the size of all or specified portions of queue storage 413 may be dynamically scaled in accordance with absolute and/or relative memory and processor utilization and I/O latency and throughput as determined and tracked by VIOC agent 225.

VIOC agents, such as VIOC agent 225, can manage VIOCs such as VIOCs 223 in different ways either individually or in cooperation with other VIOC agents. For example, an agent may manage one or more I/O queues within VIOC queue storage using a series of pre-specified priority parameters that establish relative prioritization among queues within or across VIOCs. Alternately, VIOCs can be controlled in an automated fashion by enabling VIOC agents to determine demands placed on a VM or on a specific VHD and thereby determine how much memory to assign to that particular queue at a given point in time. VIOC agent 225 may also determine virtual CPU load due to disk I/O bottlenecks and host CPU load to determine if throttling or additional VIOC storage space would benefit the VM.

VIOC agent 225 can also monitor the state of each VM and, upon a change in state, manage the corresponding I/O queues within VIOCs 223 accordingly. For example, upon a hard or soft reboot, VIOC agent 225 may commit all writes to disk and clear data within VIOCs 223 (i.e. image files 415, 417, 419). During a power down sequence, VIOC agent 225 may eliminate one or more I/O queues from the list of active queues and copy the queue states to disk for retrieval upon restart. When a VM is suspended, a VIOC agent 225 may enable the VM's corresponding queue(s) to persist in memory and commit writes. The agent may also commit writes and store to disk for retrieval when the VM is resumed.

Figure 5A:
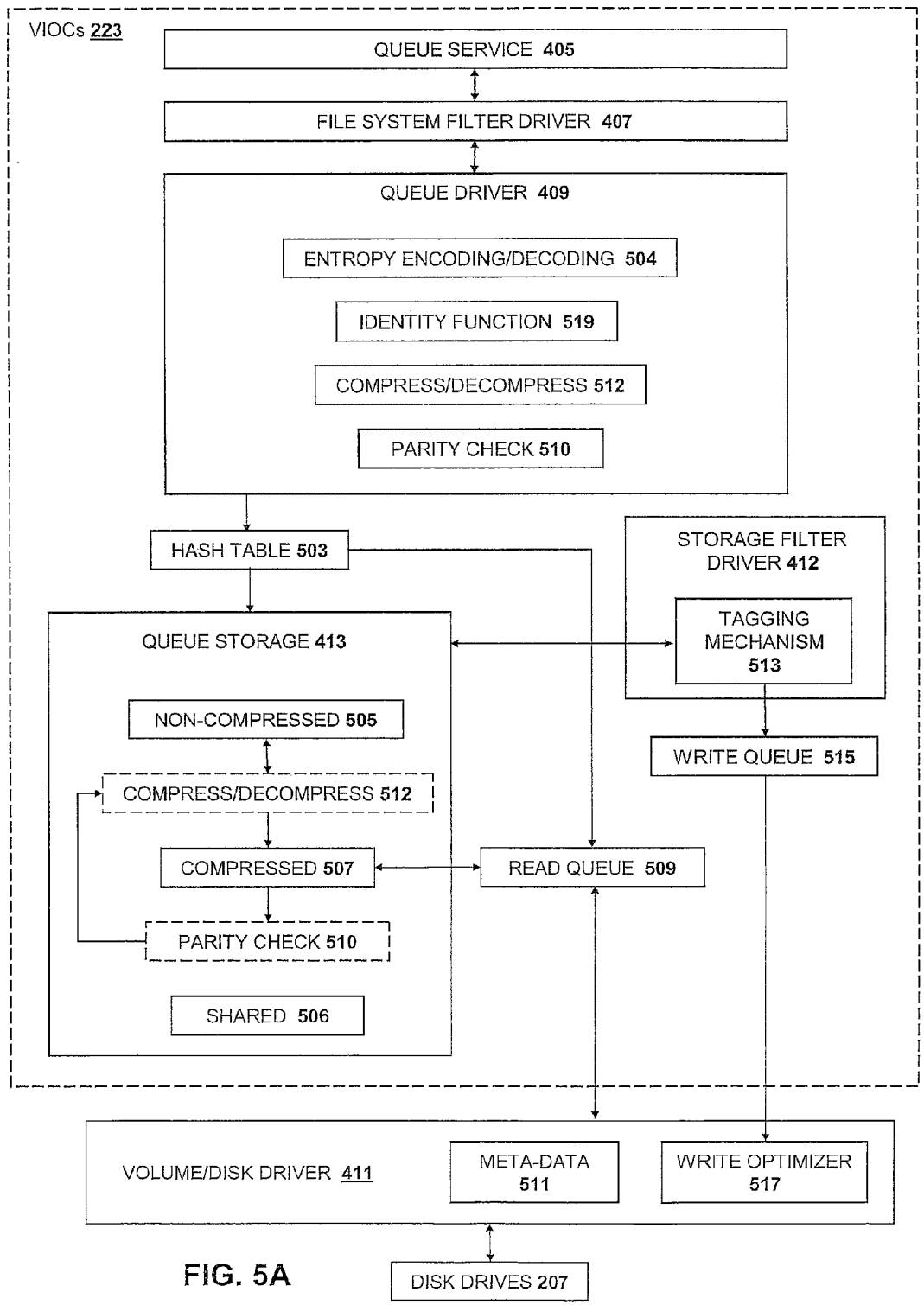
FIG. 5A is a more detailed block diagram of the various components of virtual I/O channels in one embodiment.
Figure 5B:
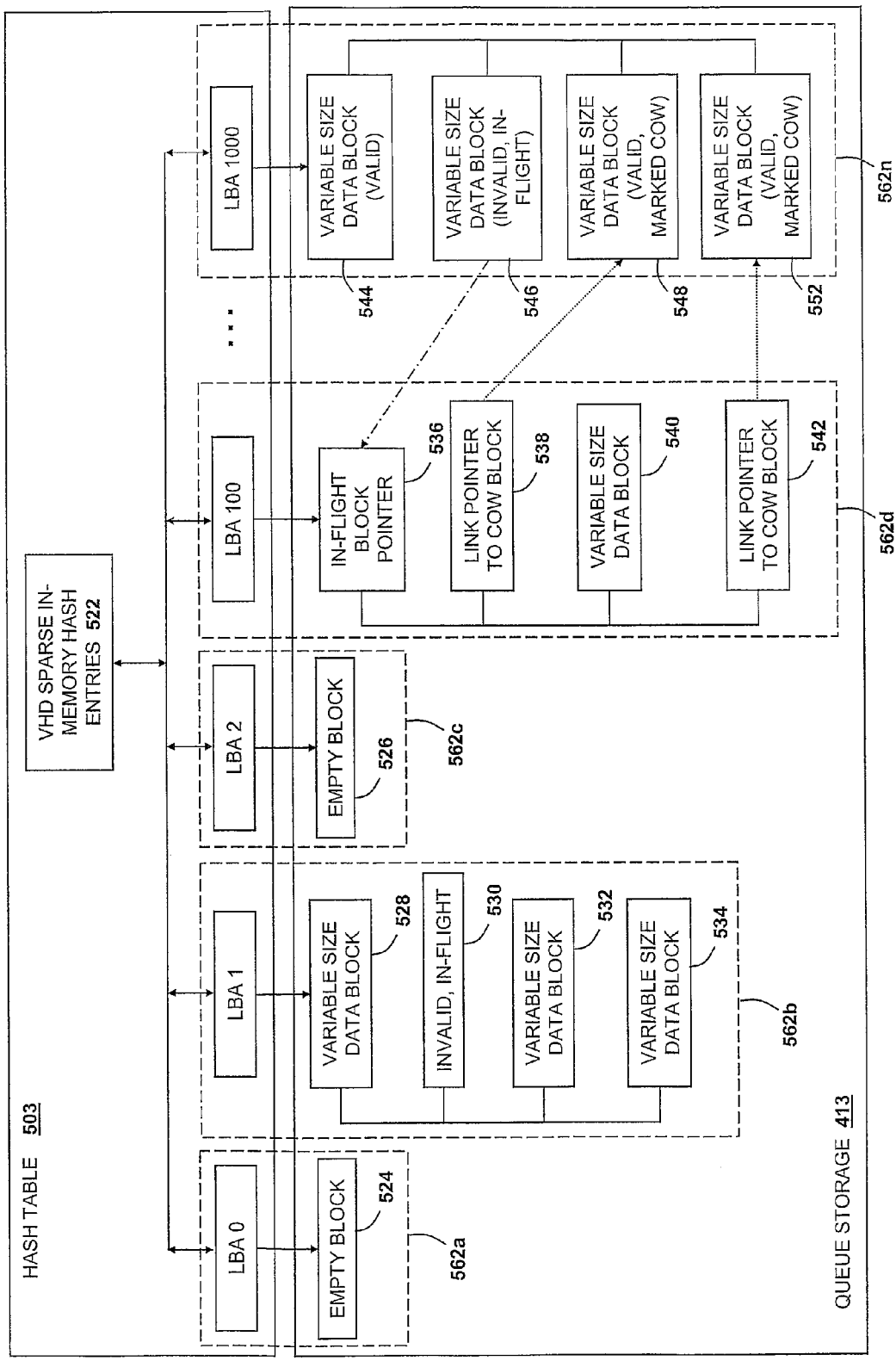
FIG. 5B is a high-level block diagram depicting queue storage such as may be implemented by the virtual I/O channels shown in FIG. 5A.

FIGS. 5A and 5B are more detailed block diagrams of an embodiment of VIOCs 223 depicting features and components for processing I/O requests in a virtualized environment. Queue service 405 provides a logical interface with performance counters (not depicted) and controls configuration of the drivers including files, directories, filesystems, and volumes that are monitored and/or queued. Filesystem filter driver 407 intercepts I/O requests which may be encapsulated within I/O request packets, and routes the requests and IRP flag data extracted from the encapsulated requests to queue driver 409. Queue driver 409 processes the I/O request data from filesystem filter driver using a hashing table 503 that performs a hashing function to determine whether queue storage 413 contains the read/write address (assuming a read/write/modify request) corresponding to requested read/write data.

Queue storage 413 generally comprises hash table indexed sets of data maintained in logically associated I/O queues 562a-562n each associated with block addresses depicted in FIG. 5B as LBAs. The data stored in queue storage 413 (i.e., within I/O queues 562a-562n) can include both non-compressed data 505 as well as compressed data 507. Data requested by a read I/O request that is in non-compressed data 505 is retrieved and sent by queue driver 409 back to the VM client requester. If requested read data is contained within compressed data 507 and not in uncompressed form, the data is decompressed and provided as non-compressed data 505 prior to being sent by queue driver 409 to the requesting client.

Queue driver 409 comprises a compression module 512 for compressing data to be stored as compressed data 507. Compression module 512 preferably includes multiple different compression engines, each employing a different compression algorithm to compress data in accordance with entropy signature characteristics as explained below. In a preferred embodiment compression module 512 includes a Lempel-Ziv Markov type compression engine that compresses data to be stored as compressed data 507 in accordance with a Lempel-Ziv Markov chain algorithm.

If data requested by an I/O read request is not located in queue storage 413 (i.e., queue read miss), the request is sent to a read queue 509 from which it is forwarded to volume/disk driver 411 which retrieves the requested data from disk drives 207. A read request handled by volume/disk driver 411 is sent to disk drives 207 as a request to read a logical block address (LBA). Data returned from volume/disk driver 411 may include the requested data as well as read-ahead data which are copied into the applicable I/O queues 562a-562n and in concert with the requested data being delivered to the requesting VM client. As depicted and explained in further detail with reference to FIGS. 5B, 13, and 15, an entropy encoding mechanism is utilized to provide smart pre-fetch in association with a read miss.

For a write I/O request, the object data block having a specified LBA is written to queue storage 413 and simultaneously or subsequently copied back to secondary storage such as disk drives 207. The write data is tagged by a tagging mechanism 513 and sent to queue storage 413 as well as to a write queue 515 which temporarily stores the write data until volume/disk driver 411 and a write optimizer 517 indicate that disk drives 207 are available to receive the data. In one embodiment, tagging mechanism 513 follows a multi-state state machine algorithm that allows dispatching of writes during idle processor and disk cycles to avoid blocking. Write optimizer 517 tracks storage availability on disk drives 207 so that the data is written to physically proximate locations to minimize file/data fragmentation.

Queue driver 409 includes logic modules and instructions that enable optimized handling of each discretely handled datum (e.g., block or page) maintained in queue storage 413. Included among such performance optimization functionality is an entropy encoding module 504 that is utilized by queue driver 409 to encode data blocks to be queued within queue storage 413 using any combination of entropy, redundancy, and efficiency values. As utilized herein, entropy generally refers to entropy as applied in the field of information theory. Examples of information theory entropy include Shannon Entropy or simply "information entropy" such as described by Claude E. Shannon in the technical paper "A Mathematical Theory of Communication" (1948), the content of which is incorporated herein by reference. Redundancy in information theory is the number of bits used to transmit a message minus the number of information bits in the message and may be derived from entropy values computed by entropy encoding module 504.

The systems and methods disclosed herein synergistically leverage the relations between information entropy, and absolute and relative redundancy to derive an identity checking function implemented by an identity function module 519 that may be usefully applied to achieve delta compression within queue storage 413. The identity checking function implemented by module 519 relies on the assumption that data blocks having equal values of information entropy, and absolute and relative redundancy are substantially identical. The identity checking function is used by queue driver 409 to achieve a delta compression that minimizes population of queue data block locations with blocks having identical data but different physical, logical, or network addresses. In this manner, the identity of a data block as determined by its information entropy and corresponding absolute and relative redundancy may be used as a unique identifier of that data block, regardless of its addressable position within a VHD, network packet, or physical disk location.

Entropy encoding module 504 includes logic, instructions, and program modules that determine/estimate the entropy of a data block in the following manner. The absolute entropy H of a block of a data set of n tokens (1, 2, ..., n) occurring with respective probabilities or frequencies $p_1, \ldots, p_n$ is defined by the equation:

$$H = -\sum_{i=1}^{n} p_i \log p_i \qquad (1)$$

For example, in a block of data comprising a bare string of English language words, the set of tokens comprises the letters a-z. The probability or frequency of occurrence of the letter a ($p_a$) is equal to the number of occurrences of a in the block divided by the total number of letters in the block. H=0 if and only if all the $p_i$ but one are zero. In other words, if all the tokens in a block of data are the same, the entropy of that block is zero. For a given number of tokens, n, H is a maximum and equal to log n when all the $p_i$ are equal (i.e., 1/n).

The ratio of the absolute entropy of a set of tokens to the maximum value it could have is the set's relative entropy, $H_{REL}$, determined in accordance with the relation:

$$H_{REL} = \frac{-\sum_{i=1}^{n} p_i \log p_i}{\log n} \quad (2)$$

Encoding module 504 further includes logic and/or program modules and instructions for determining the absolute and relative redundancy values for the data blocks. Namely, the absolute redundancy, D, at a specified token position within a block may be characterized by the relation:

$D=R-r,$ where R is the cumulative redundancy of the data string for the previous r−1 bits in the data string, and r is the redundancy of the $r^{th}$ token. The relative redundancy may be expressed as the ratio D/R.

In one embodiment, the entropy estimate may be made by entropy encoding module 504 using a frequency table for the data representation used. Frequency tables are used for predicting the probability frequency of presumed alphabetic token occurrences in a data stream and the use of such tables is well known in cryptographic arts. For example, for English language ASCII data, a 256-entry relative frequency table may be used. For the disclosed embodiments, the token stream may comprise ASCII-encoded tokens, but is not restricted to this.

In one aspect of the systems and methods disclosed herein, the entropy and redundancy values are utilized by queue management modules such as queue driver 409 to determine whether data is to be stored within queue storage 413 in a compressed format or as non-compressed data. Compression of data within queue storage 413 allows for relatively large amounts of data to be stored in VIOCs 223 with minimum consumption of physical memory. Multiple compression algorithms can be implemented concurrently by multiple compression engines for compressing across multiple data structures within queue storage 413 simultaneously.

FIG. 5B is a high-level block diagram depicting queue storage 413 such as may be implemented by the VIOCs shown in FIG. 5A. Specifically, FIG. 5B illustrates hash table 503 as generally comprising a VHD queue storage management module 522 that generates multiple queue entries that may correspond to one or more VHDs. In the depicted embodiment, the multiple queue entries correspond to logical block addresses (LBAs) 0 through 1000. Each of LBAs 0-1000 specifies the location (i.e., address) of blocks of data stored on disk drives 207 or other persistent data storage systems. The logical blocks addressed by LBAs 0-1000 are typically 512 or 1024 bytes each but may be larger or smaller depending on the storage media type.

Upon system initialization, such as during system restart or during initialization of a VM, VHD queue storage management module 522 generates a sparse table of hash entries for each of the LBAs. The hash entries logically describe the physical storage space of one or more VHDs. The entries for the LBAs are initially empty and remain empty unless and until processing of I/O requests results in data blocks being stored in compressed or non-compressed form into the VHD image managed by VHD queue storage management module 522. In the depicted embodiment, for example, LBAs 0 and 2 address I/O queues 562a and 562c, respectively, which comprise blocks 524 and 526.

The LBA 1, 100, and 1000 entries are shown as containing variable size data blocks contained within I/O queues 562b, 562d, and 562n, respectively, which preferably form a self-referential pointer space such as that implemented within linked lists. I/O queue 562b contains variable size data blocks 528, 532, and 534 as well as a block 530 containing a pointer to invalid, in-flight data. I/O queue 562d contains a variable sized data block 540 and an in-flight block pointer 536 referencing a variable size data block 546 within I/O queue 562n. I/O queue 562d further includes link pointers to copy-on-write (CoW) blocks, represented as blocks 538 and 542, which point to corresponding CoW marked variable sized data blocks 548 and 552 within I/O queue 562n. In contrast to random access organization such as provided by standard CPU cache memory, the data blocks and pointers contained in each of I/O queues 562a-562n comprise double linked lists enabling the internal cross-referencing depicted in FIG. 5B. As known in the art, a double linked list is a linked list containing a sequence of fields or nodes, each containing a data field and two link references, one pointing to a next node or data field and the other pointing to a previous node or field. Data tracking and coherency across the I/O queues is preferably performed in accordance with the modified MSI protocol depicted and explained with reference to FIG. 18. Furthermore, and as depicted and explained in further detail with reference to FIGS. 14 and 15, the data blocks contained in I/O queues 562a-562n are preferably entropy-encoded to minimize redundancy in the resultant VIOCs maintained by VHD queue storage management module 522.

Furthermore, queued data within queues 562 can be prioritized in a variety of ways such as prioritization based on any combination of hit recency (e.g. LRU), hit frequency (MFU), and queue dwell time. In a further aspect of the present invention, replacement policy prioritization may additionally or alternately utilized entropy signature correlations among queued blocks.

In the embodiments thus far described and illustrated, the VIOCs have been host-configured and managed. In an alternate embodiment of the systems and methods disclosed herein, VIOCs may be configured and managed on the virtual machine level. In such an embodiment, and as illustrated in FIG. 3, the VIOCs may be implemented at both the host level and the virtual machine level, or exclusively at the virtual machine level.

Figure 3:
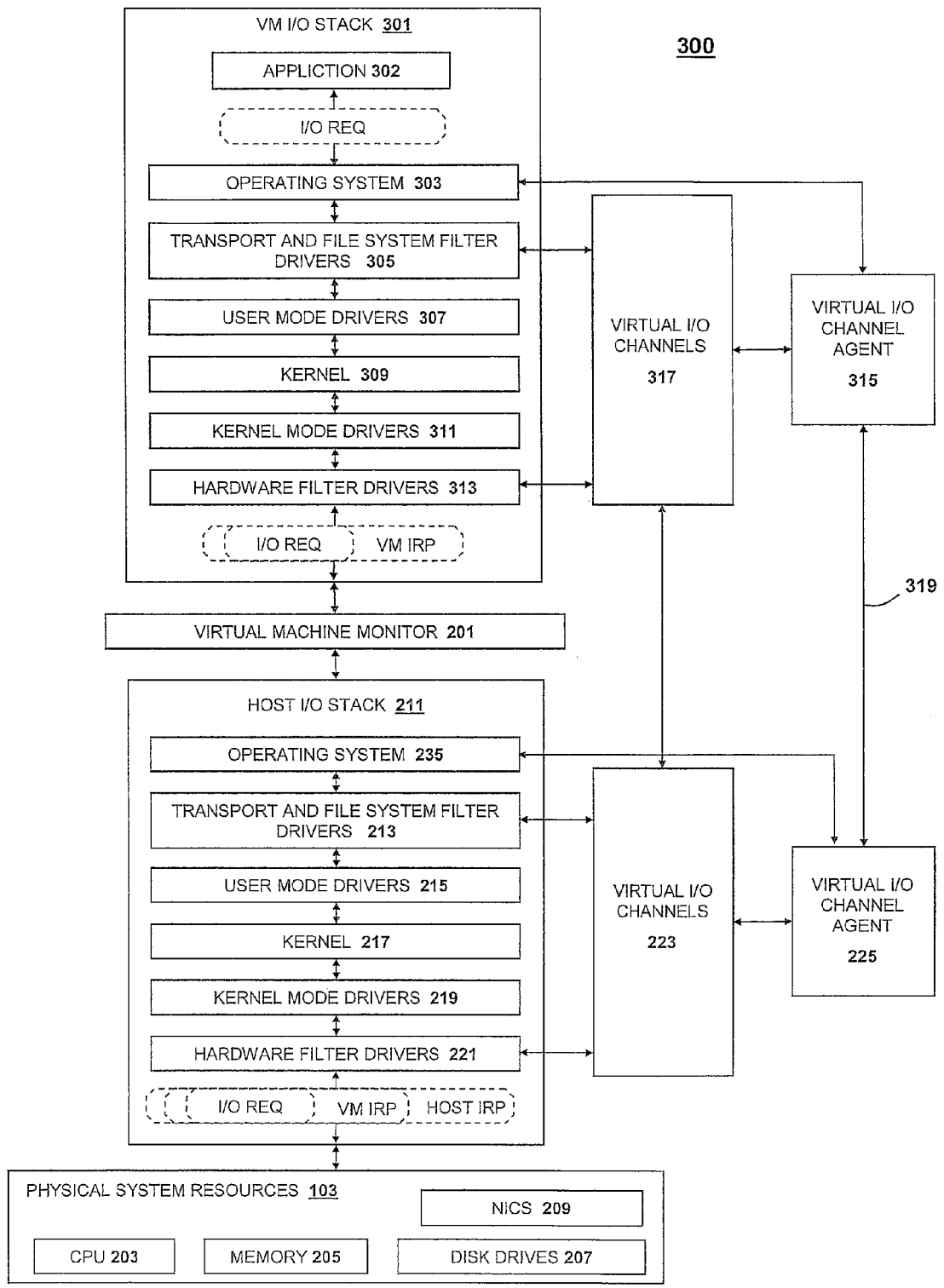
FIG. 3 is a block diagram of an exemplary architecture of a virtualized computer system implemented according to an alternate embodiment.

FIG. 3 illustrates a system 300 in which VM-level VIOCs are implemented and managed at both the host level and the virtual machine level. VMM 201, host OS stack 211 and its components, hardware 103 and its components, VIOCs 223 and VIOC agent 225 are substantially the same as those described with reference to FIG. 2. Analogously to host I/O stack 211, a VM I/O stack 301 comprises multiple instruction and logic layers for implementing an I/O request processing protocol. Namely, VM I/O stack 301 generally comprises an OS 303, a set of transport and filesystem drivers 305, a set of user mode drivers 307, a kernel 309, a set of kernel mode drivers 311, and a set of hardware filter drivers 313. Interfaced with VM I/O stack 301 are a set of VM-level VIOCs 317 and a VM-level VIOC agent 315. VM I/O stack 301, VIOCs 315, and VIOC agent 317 operate in substantially the same way as described above with respect to a host implementation of the VIOCs and VIOC agent.

The depicted VM stack and host stack VIOC interfacing of system 300 provides a VM I/O queuing domain and a host I/O queuing domain enabling improved I/O request processing. As shown in FIG. 3, an I/O request, I/O REQ, originating from a VM application is processed through the depicted VM I/O processing stack. As I/O REQ is processed, it is encapsulated within a VM I/O request packet, VM IRP. The application and virtual hardware specific context contained in request flags and other context data may be read and unmasked by file system filter drivers 305 and VM hardware filter drivers 313 such that VIOCs 317 may construct and manage corresponding VHD images in accordance with VM stack processing data.

The reading and unmasking of application and virtual hardware specific context performed by the filter drivers is used to supply hints to a corresponding queue driver or other manager of VIOCs 317 on how to handle the corresponding I/O data blocks. These hints are encapsulated in the IRP flags used in either the VM itself (the guest OS) or from the VMM to the host OS. An example of these flags could be a set of flags indicating that the I/O is expected to be synchronous in nature, with sequential reading or writing characteristics and that the initiating application does not want any intermediate buffering to take place due to consistency constraints. These hints are used by the queue driver to shorten the I/O data path or reduce I/O latency by pre-selecting allocation strategies for the queue driver or determining expected seek characteristics (direction of head movement on a physical disk platter, if the underlying device is a physical disk) of the underlying storage device. An example of this is Rotational Positioning Sensing (RPS) where the underlying physical device begins head movement before initiation of follow on I/O.

The VM I/O request packet, VM IRP, is then passed to host stack 211 via VMM 201 where it is processed layer-by-layer until it is encapsulated within a host I/O request packet, HOST IRP. Host-level file system filter drivers 213 and hardware filter drivers 221 may read and unmask I/O request context contained in flags and other context data within HOST IRP such that VIOCs 223 may construct and manage corresponding VHD images in accordance with VM stack and host stack processing data.

As further depicted in FIG. 3, VIOC services are shared between the VM and host systems. A communication link 319 is provided between VM-level VIOC agent 315 and host-level VIOC agent 225. VIOC agent 225 monitors queue statistics and utilization for optimizing the performance of VIOCs 223. In a similar manner, VM-level VIOC agent 315 monitors queue statistics and utilization of the VIOCs 317 for optimizing the performance of VIOCs 317.

Communication link 319 enables the agents to communicate with each other to optimize performance of the overall VIOC system. While depicted in FIG. 3 as an external connection, communication link 319 can also be implemented in shared memory space, as a serial or parallel pass-through interface, or as a global variable pass-through. Communication link 319 may also be implemented as an infiniband link, or as a disk storage interface. If communication link 319 is implemented as part of a disk storage interface, the data collected and used by VM VIOC agent 315 may be written into an area inside of a virtual hard disk while VIOC agent 225 mounts a read-only copy of the virtual machine's disk (i.e., VHD) and reads the statistics accordingly such as via an interprocess call/remote procedure call (IPC/RPC).

Figure 6:
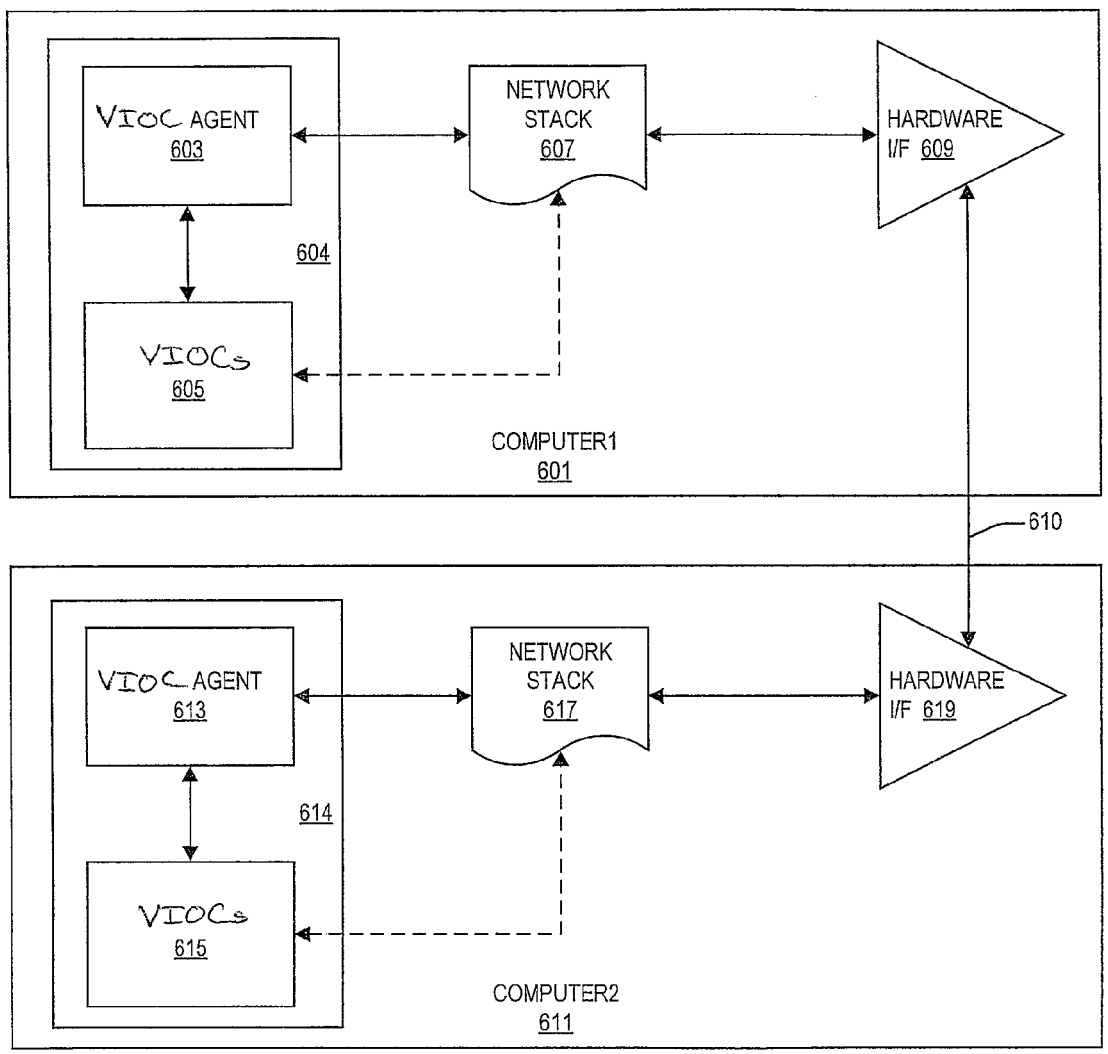
FIG. 6 is a simplified block diagram illustrating exemplary communications between different VIOC systems of different computer systems.

FIG. 6 is a simplified block diagram illustrating exemplary communications between different VIOC systems of different computer systems, including the same or different types of computer systems (e.g., physical versus virtualized). Two computers, shown as computer1 601 and computer2 611, are each configured as either a VM or a physical host system. In this manner, communications are illustrated for VM-to-VM or host-to-VM communications in which such communications are similar regardless of the configuration of the particular computer system. The computer1 601 includes a VIOC system 604 having a VIOC agent 603 and corresponding VIOCs 605. For a physical host system, VIOC agent 603 and VIOCs 605 are configured similar to the host-level VIOC agent 225 and host-level VIOCs 223 previously described. For a VM (e.g., VM 131), VIOC agent 603 and VIOCs 605 are configured similar to the VM-level VIOC agent 317 and VM-level VIOCs 315 previously described.

A network stack 607 interfaces with VIOC agent 603 for communications and data transfers; data transfers, however, may also be made directly between VIOCs 605 and network stack 607. Network stack 607 is configured as any standard or custom implementation including, but not limited to, Transmission Control Protocol/Internet Protocol (TCP/IP), User Datagram Protocol (UDP), Hypertext Transfer Protocol (HTTP), and/or custom protocols including wirespeed protocols and the like. Network stack 607 interfaces a hardware interface (I/F) 609, which represents either a hardware I/F within host physical system resources 103 or a virtual hardware I/F within virtual hardware resources 143 (FIG. 1B). The hardware I/F 609 may include any one or more of several types of hardware interface types, such as Infiniband®, Ethernet, Token Ring, SCSI, direct memory access (DMA), remote direct memory access (RDMA), or any other networking or disk channel technology.

Computer2 611 includes a VIOC system 614 configured in substantially the same manner as VIOC system 604 and includes a VIOC agent 613 and VIOCs 615 similar to VIOC agent 603 and VIOCs 605. VIOC system 614 communicates with a network stack 617, which is configured in similar manner as the network stack 607 and which interfaces a hardware I/f 619 configured in similar manner as the hardware I/F 609. VIOC system 604 is able to communicate with external entities via the hardware I/F 609 and VIOC system 614 is likewise able to communicate with external entities via the hardware I/F 619.

A communication link 610 is shown provided between the hardware I/Fs 609 and 619, enabling communication between VIOC systems 604 and 614. Such communication is enabled between multiple VMs, host systems, VM to host, host to VM, etc. The hardware I/Fs 609 and 619 may be different or otherwise incompatible in which case communication link 610 provides the appropriate translation between the hardware interfaces. Communication link 610 is a more specific embodiment of the communication link 319 implemented between the host and VM queue agents 225 and 315 shown in FIG. 3. The communication methods may also be according to alternative methods as known to those skilled in the art, such as memory searches, pointers, VMM directions, redirections, etc. It should be noted that the system implemented as shown in FIG. 6 is not limited to two hosts but may include any number of networked or otherwise connect host systems.

Figure 7:
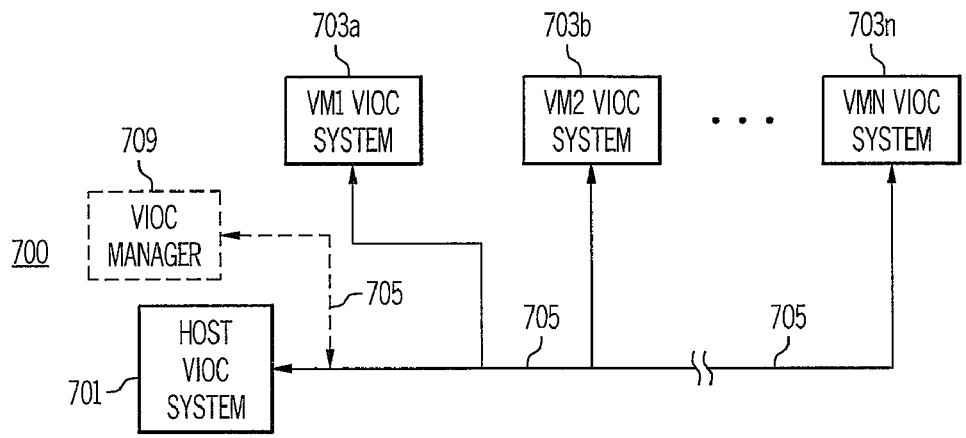
FIG. 7 is a block diagram of a host system having a host-level VIOC system and a number of VM-level VIOCs.

FIG. 7 is a block diagram of a host system 700 with a host VIOC system 701 and a number "N" of VM VIOC systems 703, individually shown as VM1 VIOC system, VM2 VIOC system, . . . VMN VIOC system, illustrating communication between VIOC systems. Each VIOC system, including the host VIOC system 701 and each VM VIOC system 703, includes VIOCs and a VIOC agent configured in a similar manner as previously described. Communication links 705 illustrate that host VIOC system 701 is able to communicate with each of VM VIOC systems 703 and that VM VIOC systems 703 are able to communicate with each other. Each communication link 705 may be configured in a similar manner as the communication link 610 enabling interfaces between corresponding hardware interfaces. In one embodiment, communication is conducted on a peer-to-peer basis and queue management functions are centralized or distributed among one or more of the VIOC systems.

In an alternate embodiment, a centralized VIOC manager 709 is provided for managing VIOC functions of the host VIOC system 701 and the VM VIOC systems 703. VIOC manager 709 is shown with dashed lines indicating an optional configuration. VIOC manager 709 performs queue management functions which may or may not be performed its own local VIOCs/I/O queues. In one embodiment, communication links 705 are extended to VIOC manager 709 to enable communications between VIOC manager 709 and the host VIOC system 701 and each of the VM VIOC systems 703. In this case, host VIOC system 701 and VM VIOC systems 703 are able to communicate with each other while management functions are centralized at VIOC manager 709. In an alternate embodiment, host VIOC system 701 and each of VM VIOC systems 703 communicate solely with VIOC manager 709.

Figure 8:
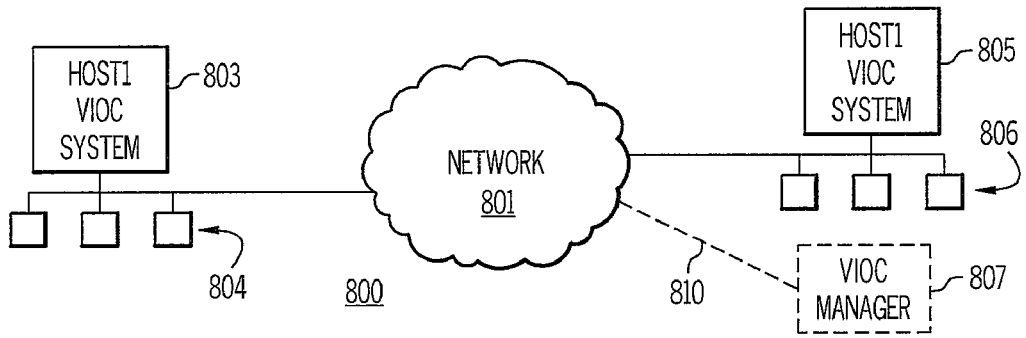
FIG. 8 is a simplified block diagram of a network VIOC system illustrating communication between host-level VIOC systems via a network.

FIG. 8 is a simplified block diagram of a network VIOC system 800 illustrating communication between host VIOC systems 803 and 805 (individually labeled host1 VIOC system 803 and host2 VIOC system 805) via a network 801. Again, each host VIOC system 803 and 805 includes local VIOCs and a local VIOC agent configured in a similar manner as previously described. Each host VIOC system 803 and 805 may be interfaced with any number of VM VIOC managers in a similar manner as shown in FIG. 7. For example, host1 VIOC system 803 is linked to any number of VM VIOC systems 804 and host2 VIOC system 805 is linked to any number of VM VIOC systems 806. Each VIOC system communicates via a corresponding hardware interface in a similar manner as shown in FIG. 6 in which the communication link 610 contemplates the network 801. In this manner, any number of VIOC systems communicate across network 801 for purpose of VIOC/queue control and management. The VIOC systems, including the host VIOC systems 803 and 805 and the VM VIOC systems 804 and 806, may communicate on a peer-to-peer basis. Also management is either centralized at any one VIOC system or distributed among multiple VIOC systems in the network VIOC system 800.

In an alternate embodiment, a VIOC manager 807 is also shown linked to the network 801 via communication link 810. VIOC manager 807 is shown with dashed lines indicating an optional configuration. In centralized configuration, VIOC manager 807 communicates with each of the host VIOC systems 803 and 805 for purposes of VIOC/queue management and may further communicate with each of the VM VIOC systems 804 and 806. In one embodiment, for example, each VM VIOC system 804 and 806 may be linked to the network 801 in addition or in the alterative to be linked to its local host VIOC system. In this manner, VIOC manager 807 is individually interfaced with each of the host VIOC systems 803 and 805 and each of the VM VIOC systems 804 and 806.

A centralized queue manager, such as VIOC managers 709 and/or 807, may be executed as an application on any host system or on any VM of any given host system. Each VIOC system being centrally managed includes a local VIOC agent which monitors the queue statistics and processor/memory utilization of its corresponding queue and reports the information to the central queue manager. The VIOC manager instructs each VIOC system, such as using a predetermined command protocol or the like, to adjust its queue and queue operations to optimize queue functions in the system.

Figure 9:
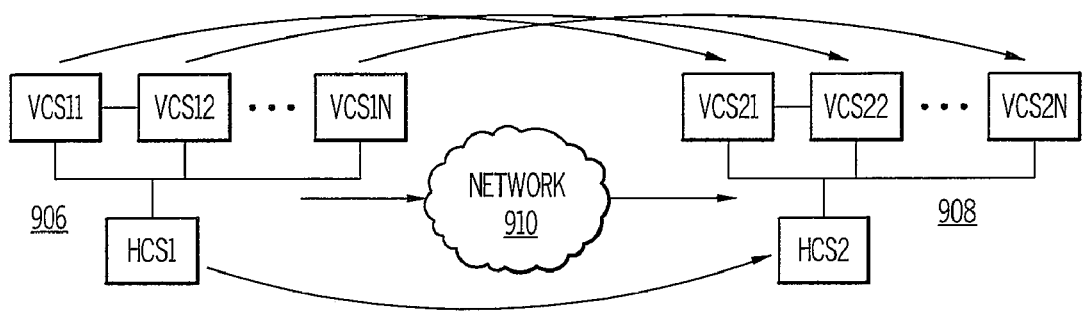
FIG. 9 is a simplified block diagram illustrating replication of a VIOC system architecture according to an exemplary embodiment.

FIG. 9 is a simplified block diagram illustrating replication of a VIOC system architecture according to an exemplary embodiment. A first VIOC system architecture 906, including a host VIOC system HCS1 and N VM VIOC systems VCS11, VCS12, . . . VCS1N, is coupled to a network 910 in a similar manner as previously described. It is desired to replicate VIOC system architecture 906 into another, similar VIOC system architecture, shown as a second VIOC system architecture 908, through the network 910. A communication and queue management architecture according to an exemplary embodiment facilitates the replication procedure. As illustrated, the first host VIOC system HCS1 is replicated to a second host VIOC system HCS1 across the network 910. Likewise, the VM VIOC systems VCS11, VCS12, . . . , VCS1N are replicated to a second set of VM VIOC systems VCS21, VCS22, . . . , VCS2N, respectively, of the second VIOC system architecture 908. Communication links are established between VIOC systems of the second VIOC system architecture 908 to mimic that of the first VIOC system architecture 906.

Figure 10:
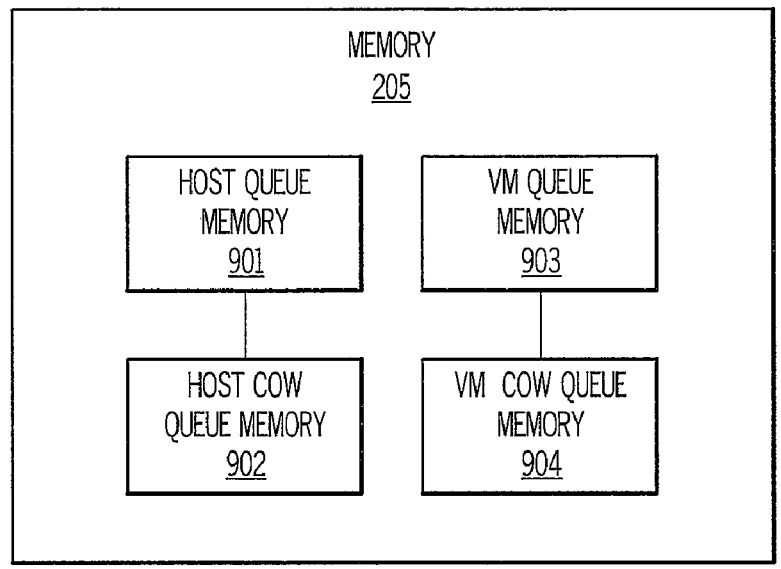
FIG. 10 is a block diagram illustrating an alternate embodiment of host and VM I/O data queue memories.

FIG. 10 is a block diagram illustrating an alternate embodiment of host and VM queue memories. As illustrated, a host queue memory 901 and a VM queue memory 903 are both stored in the memory 205. The host queue memory previously described is a dynamic memory in which stored data is constantly changing in response to I/O requests. In contrast, host queue memory 901 is a static memory with predetermined pre-stored data that does not change over time. The static host queue memory 901 is interfaced with a dynamic host Copy On Write (CoW) queue memory 902, which stores data from subsequent read or write operations. In particular, new data is written to host CoW queue memory 902 so that the data of host queue memory 901 remains unmodified. When new data is written to a data block that is addressed by multiple VMs, this data block is then copied to the block previously occupied only by a pointer if and only if the data block does not have identical LBAs but matches only at the entropy/redundancy level, since the VM that previously referenced this block did not modify this memory. If the LBA of the CoW block is the same between both VMs then the block is not copied but instead both VMs have modifications to this block to complete. Data is read from either host queue memory 901 or host CoW queue memory 902 depending upon where the data is located. A similar static VM queue memory 903 interfaced with a dynamic VM CoW queue memory 904 is included in memory 205 and operates in the same manner. In an alternate embodiment, a CoW can be used specifically when an UNDO disk is used. In this manner, writes are never committed to the disk when an UNDO disk is discarded at the end of a session, resulting in reduced reset time. Alternatively, the writes could be committed on-demand following a sequence in accordance with the previously described embodiment.

Figure 11:
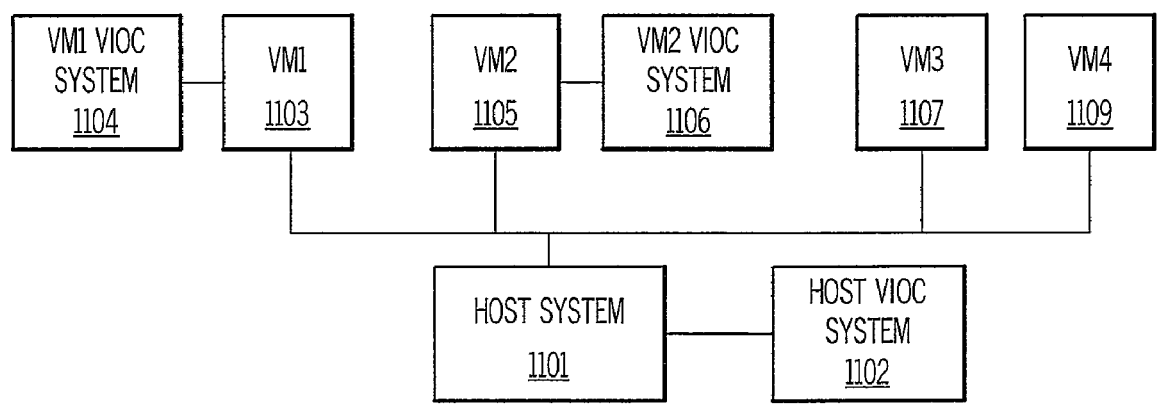
FIG. 11 is a block diagram illustrating a mixed mode system according to another embodiment.

FIG. 11 is a block diagram illustrating a mixed mode system according to another embodiment. In this case, a host system 1101 includes a host VIOC system 1102 (such as, for example, including VIOCs 223 and VIOC agent 225). Host system 1101 supports several VMs, including, for example, a first VM1 1103, a second VM2 1105, a third VM3 1107 and a fourth VM4 1109. The VM1 1103 includes a VM1 VIOC system 1104 and the VM2 1105 includes a VM2 VIOC system 1106. In one embodiment, the VM1 1103 and the VM2 1105 leverage only their respective VM VIOCs 1104 and 1106, respectively, rather than the host VIOC system 1102. Alternatively, the VM1 1103 and the VM2 1105 leverage their own VM VIOCs and host VIOC system 1102. In contrast, the VM3 1107 and the VM4 1109 do not include corresponding VM VIOC systems. The VM3 1107 and the VM4 1109 generally leverage the host VIOC system 1102.

Figure 12:
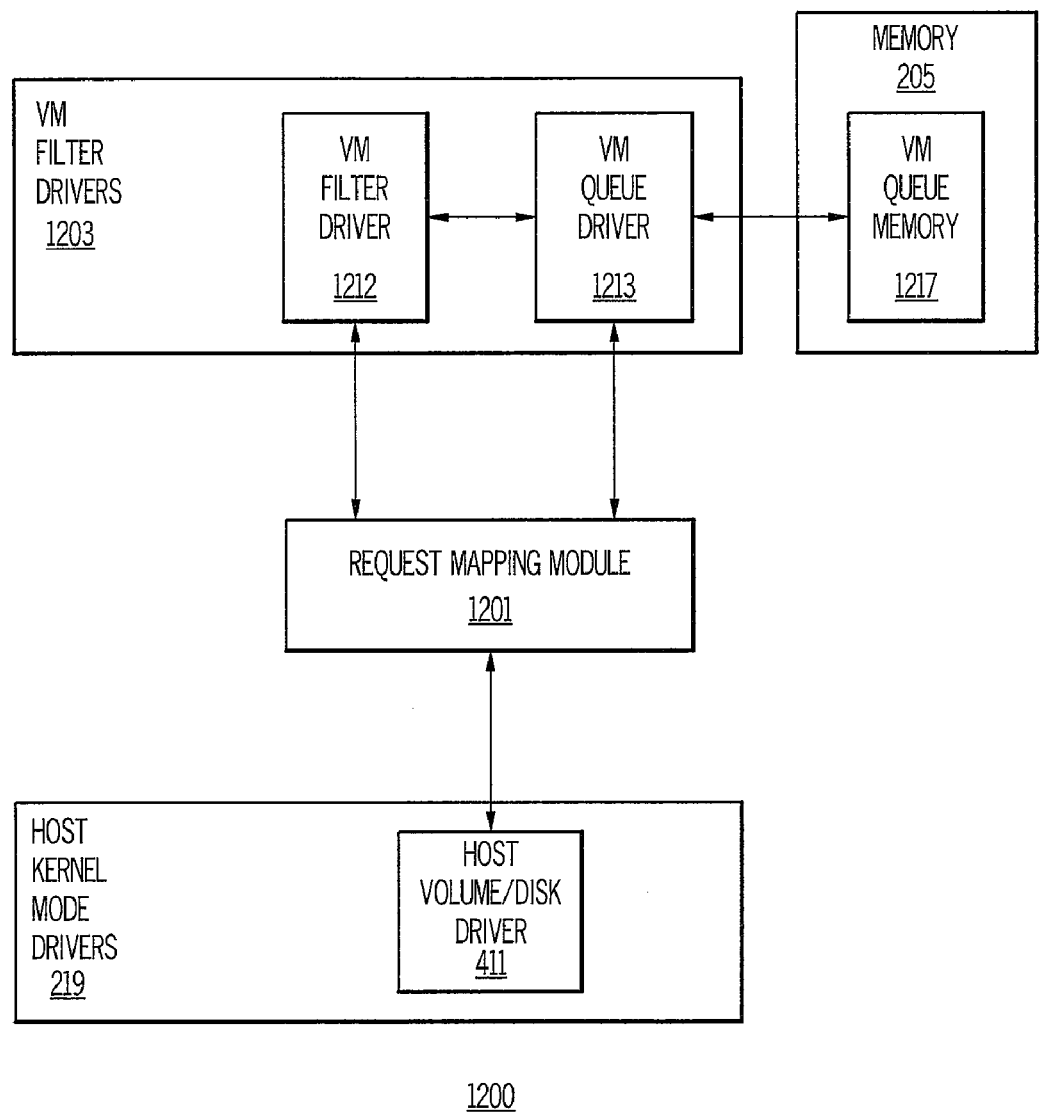
FIG. 12 is a block diagram of a hybrid VIOC system according to another embodiment.

FIG. 12 is a block diagram of a hybrid VIOC system 1200 according to another embodiment. The VM filter drivers 1203 are shown including the VM queue filter driver 1212 interfacing the VM queue driver 1213 in a similar manner as previously described for host VIOCs 223. Also shown is memory 205 including a VM queue storage 1217 interfacing VM queue driver 1213 in a similar manner as previously described. In this embodiment, however, the VM volume/disk driver 411 is replaced with a request mapping module 1201. VM queue filter driver 1212 and VM queue driver 1213 both interface the request mapping module 1201, which directly interfaces the host volume/disk driver 411 of the host kernel mode drivers 219. In this manner, the VM VIOCs more directly interface the host hardware via the host volume/disk driver 411 thereby bypassing significant portions of the VM stack and the host stack. The host VIOC system, such as including VIOCs 223 and VIOC agent 225 is optional and may be eliminated with the exception of host volume/disk driver 411.

In the previous configurations, I/O queuing occurs on the host or the VM or both. The hybrid VIOC system 1200 is a combined solution that splits the I/O queuing mechanism between the host and VM. By splitting the I/O queuing mechanisms between the host and the VM systems, a greater efficiency is achieved through bypassing the additional overhead of unnecessary filter drivers and redundant I/O queues. VM queue filter driver 1212 operates as part of the VM and communicates with the VM-based I/O queue. A read I/O request, for example, is passed from a VM application through VM queue filter driver 1212 and then either to a VM I/O queue (if it is a queue hit) or down through the VM kernel layers to the VMM 201 and then onto the stack of the physical host system. Under the host OS stack is the kernel mode filter driver that catches the I/O request (a logical block) or (logical block number) and requests the data from the disk drives 207. It then passes the response back up the stack and populates the VM queue with the requested block.

In the event of a queue hit, request remapping module 1201 remaps a virtual I/O request to a physical I/O request in most cases. A virtual I/O request may be directly mapped to a physical I/O. In one embodiment, the translation occurs through a block map that stores the location of the physical block in perspective to the matching logical block. In this manner, the VM user mode filter driver and the physical host kernel driver communicate with one another as though they were directly linked. This allows for the VM queue to function very efficiently inside of the VM. It is noted that is possible to locate the queue outside of the VM as well, such as a host-level queue. The translation may occur inside of the VMM 201, on the host OS 235, or even within the memory 205. In another embodiment, the I/O queue can reside on the host system.

Figure 13:
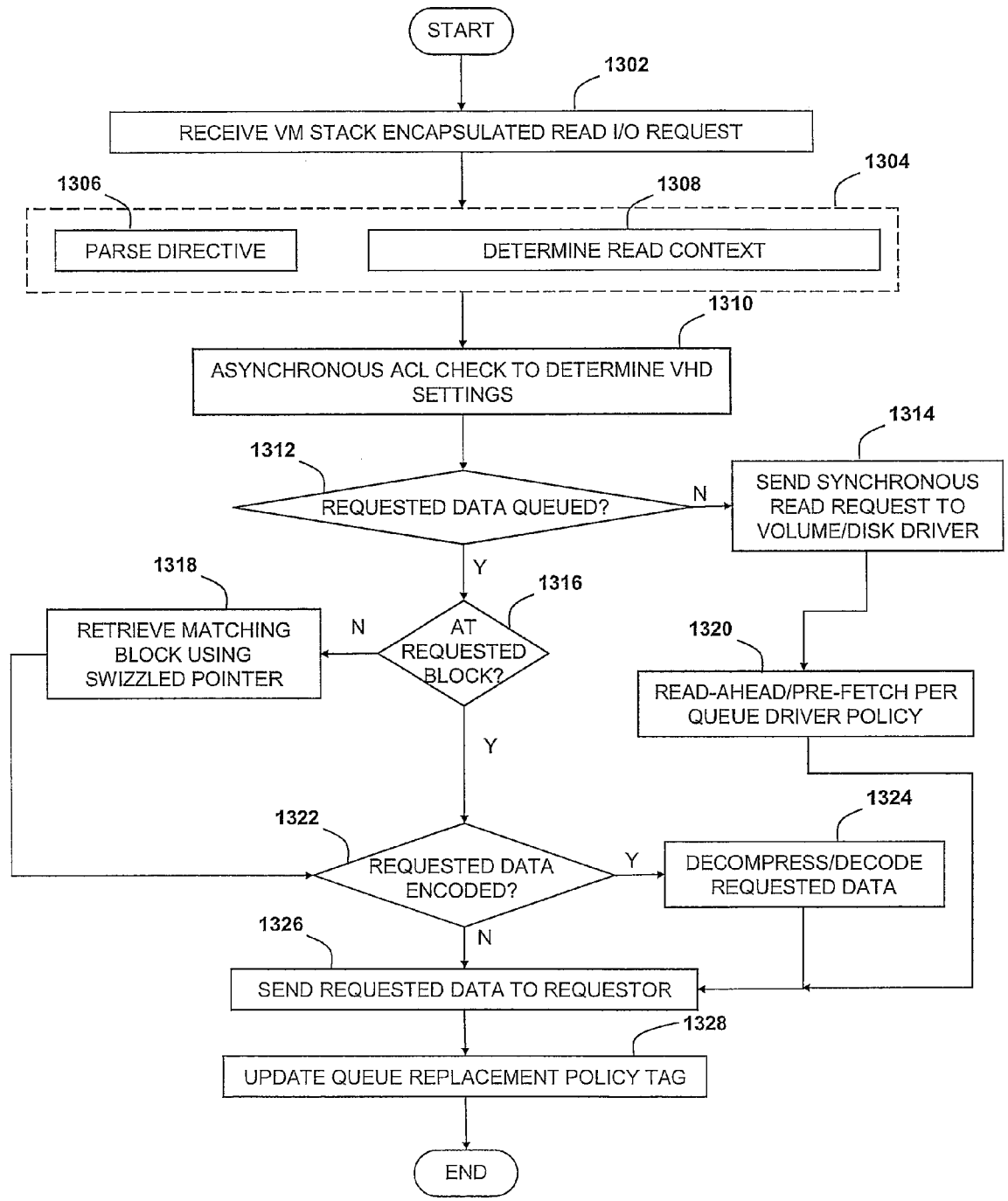
FIG. 13 is a flow chart depicting read I/O request processing according to an embodiment.

FIG. 13 is a high-level flow diagram illustrating steps performed during processing of a read request as implemented by virtualized I/O request processing architectures such as shown in FIGS. 2, 3, 4, 5A, and 5B. The process begins as shown at step 1302 with host I/O stack 211 receiving a read-type I/O request from VMM 201. The read request received by host stack 211 has been generated by a VM application client and processed by the VM I/O stack. In addition to the read directive, the read request is encapsulated with VM-specific context data.

The VM I/O stack encapsulated read request is received by a filter device at or near the top of host I/O stack 211. In one embodiment, the receiving filter device(s) may comprise file system filter driver 407, which processes the VM I/O stack encapsulated read request as shown at step 1304. Specifically, file system filter driver 407 parses the request command/argument directive (in this case a read of specified data) at step 1306, and further determines the request context as conveyed by the VM stack encapsulation/encoding (step 1308). Assuming the read request is received as a VM encapsulated I/O request packet (IRP), the context data is typically encoded as IRP flags. The directive and request context determined by filesystem filter driver 407 is received by queue driver 409 which processes this information to handle the request using VIOCs 223.

In addition to the request information extracted by the filter device, queue driver 409 receives VHD settings data from a storage filter driver 412 as shown at step 1310. The VHD data preferably includes file system characteristics such as may be obtained from meta data 511 stored in association with the underlying VHD. The determination and retrieval of such VHD data by queue driver 409 from storage filter driver 412 may be asynchronous to any given I/O request.

As explained above with reference to FIG. 3, queue driver 409 assesses the read request context data extracted by filesystem filter driver 407 with host volume/disk driver meta data from storage filter driver 412 to make VIOC access decisions with respect to the read request. For example, the IRP flags may indicate that the read request is part of a series of synchronous requests having sequential reading/writing characteristics. Queue driver 409 uses such "hints" in conjunction with storage side/VHD meta data to pre-selected queuing allocation (e.g. read-ahead, pre-fetch) to be performed with respect to the presently received read request.

The read request processing continues as illustrated at step 1312 with queue driver 409 determining whether the requested data is queued locally within VIOCs 223. Queue driver 409 determines whether the data is queued by accessing hash table 503 which indexes queue entries 562a-562n corresponding to the LBAs of underlying VHDs. Referring to the depiction of hash table 503 in FIG. 5B, for example, the requested data may be determined at step 1316 to be locally queued at the requested address within one of the depicted variable sized blocks stored within queues 562b, 562d, or 562n. Alternatively, queue driver 409 may determine at steps 1312 and 1316 that the requested data is queued within VIOCs 223 at a different address using the pointer swizzling illustrated and explained with reference to FIGS. 5A and 5B. If so, the matching data is located using a corresponding swizzled pointer as shown at step 1318.

Upon locating the directly or referentially stored requested data, and if the queued data is entropy encoded, the requested data block is decoded prior to being sent to the requesting VM client (steps 1322, 1324, and 1326). If the requested data is compressed within its respective queue within queue storage 413, the decoding illustrated at step 1324 further includes decompressing the data either as part of or in addition to the entropy signature decoding process.

Returning to step 1312, responsive to queue driver 409 determining that the requested data is not accessible from VIOCs 223 (i.e., a queue miss), the read request is sent down host I/O stack 211 for processing (steps 1312 and 1314). As part of the queue miss processing, a read-ahead or pre-fetch is performed with the data fetch as shown at step 1320.

As part of retrieving the data from one of the queues within VIOCs 223 or copying to/updating the queue in case of data copy from volume/disk driver, the queue replacement policy tag (e.g., LRU) is updated as shown at step 1328 and the process ends.

Figure 14:
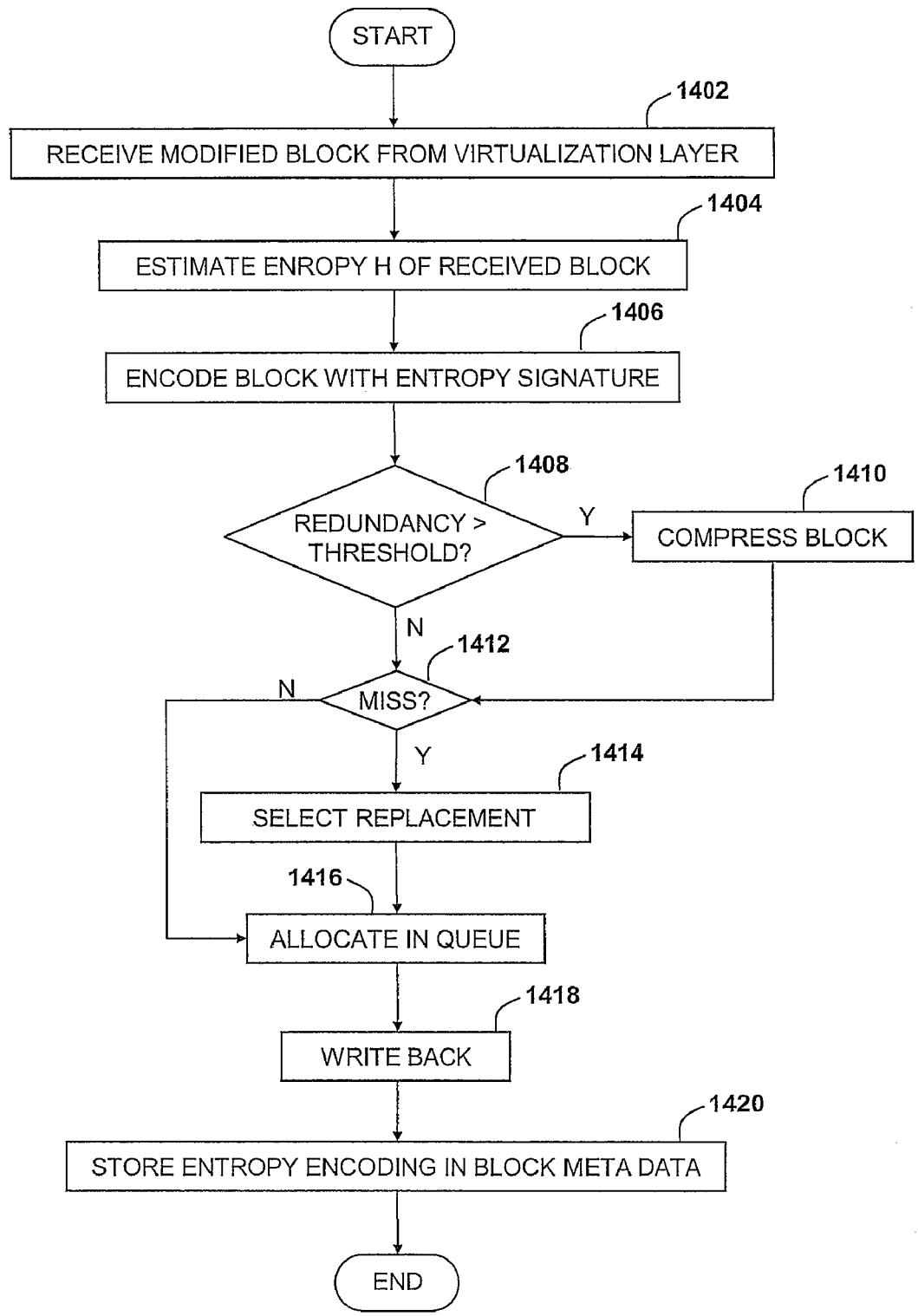
FIG. 14 is a flow chart illustrating modify-write processing according to an embodiment.

Referring now to FIG. 14, there is illustrated a modify-write portion of a read/write/modify processing sequence as processed by VIOCs 223. The process begins as shown at step 1402 with a modified block of data received by queue driver 409 to be written to queue storage 413. Entropy encoding module 504 encodes the received block by first estimating one or more entropy and/or redundancy values for data block, as illustrated at step 1404. In one embodiment, the entropy and redundancy values determined by module 504 include the absolute entropy as well as the absolute and relative redundancy of the data block.

Entropy encoding block 504 utilizes the computed entropy/redundancy values to encode the received data block as shown at step 1406. The entropy encoding may be performed as a data transform of the block data such as by compression or encryption. The entropy encoding may also comprise associating one or more entropy/redundancy values as a token or header with the data block within VIOCs 223. For example, if a 64-bit entropy value is estimated for the data block, the 64-bit value may be stored as a meta data tag for the block within the block's metadata 511. The entropy encoding serves multiple purposes including block compression and delta compression as well as for optimizing ensuing pre-fetch or read-ahead operations performed when the data block is removed from the queues and subsequently fetched back into queue storage 413.

Queue driver 409 determines whether, in accordance with the estimated entropy value, the data has exceeded a specified redundancy threshold (step 1408). If not, queue driver 409 stores the received data as non-compressed data 505 within queue storage 413, as shown at step 1416. If a write miss occurs (step 1412), a block replacement cycle is commenced (step 1414) in association with writing the non-compressed data to queue storage 413. The block replacement depicted at step 1414 is performed in accordance with a specified queue replacement policy. The replacement policy may be based on any combination of hit recency (e.g. LRU), hit frequency (MFU), and/or queue dwell time. In one embodiment, the replacement policy includes correlating the entropy signatures of queue blocks in combination with hit recency or frequency to account for similarity between blocks and relative activity as criteria for replacement.

If, as determined at decision step 1408, the received data has a redundancy value greater than the specified threshold level, compression module 512 compresses the data as indicated at block 1410 prior to the data being written to queue storage 413. Following or in conjunction with the compressed or non-compressed data being queued within queue storage 413, the data is written back to disk or other backing storage (step 1418) and the entropy encoding for the data block is stored in the block's meta data 511 (step 1420).

Figure 15:
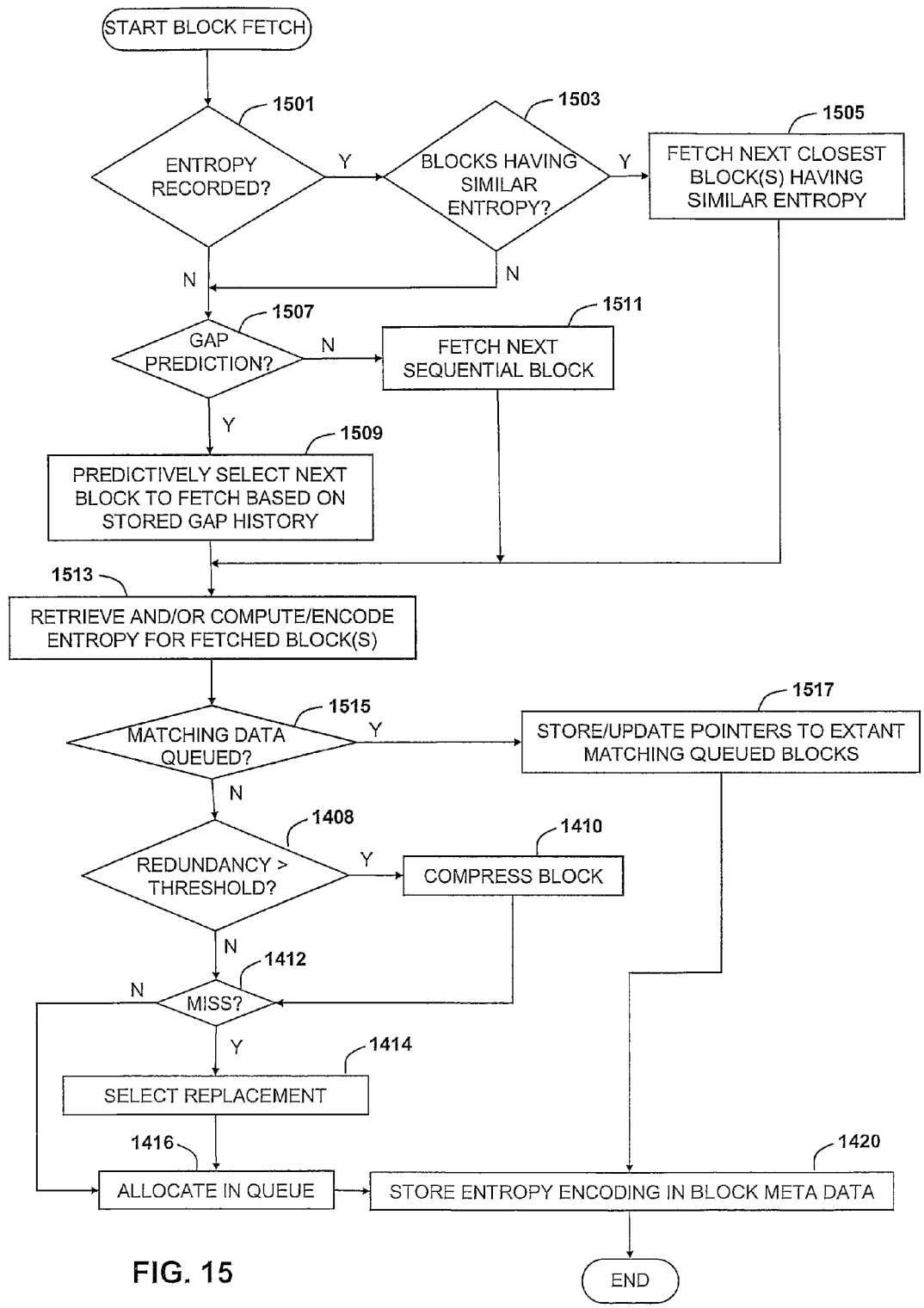
FIG. 15 is a flow chart depicting pre-fetch/read-ahead processing according to an embodiment.

Referring now to FIG. 15, there is illustrated an embodiment of a read-ahead or pre-fetch cycle such as may be implemented as part of a queue miss read depicted at step 1320 in FIG. 13. Queue driver 409 determines, at decision step 1501, whether the entropy/redundancy signature of a data block to be fetched into queue storage 413 has been recorded. If so, the read-ahead selection includes checking for stored blocks having entropy signatures, also previously recorded, that are similar to the entropy signature of the target block being fetched (step 1503). In one embodiment, a data block is determined to be similar to another data block if their respective entropy values are within 6% of each other (i.e., entropy values are similar to at least a value of 94%).

If, as determined at decision step 1503, there are blocks with similar entropy within a specified physical address distance from the target fetched block, the closest block(s) in terms of LBA are also fetched as shown at step 1505. In the depicted embodiment, the blocks may reside any logical distance from the requested block, and the queue driver will pre-fetch and pre-load up to 4096 (4k) blocks. If any of the re-requested pre-fetch blocks reside in any queue, including queues not handling the current I/O request, the pre-fetch will consist of only a pointer update and the block will not actually be fetched or inserted into the queue handling the request. The queue consistency protocol (described below as a modified MSI with reference to FIGS. 16-17) will only copy the block into the requester queue if the block becomes modified or invalid in another queue.

Returning to step 1501, if the entropy of the target fetch block is not recorded or if no stored blocks proximate the fetch block are found to have similar entropy, queue driver 409 determines if gap prediction data has been recorded for previous read cycles (step 1507). Gap prediction is performed by tracking the distance or "gap" between successive reads in which data is fetched from a particular file stored on a VHD. If usable gap prediction data is available, one or more blocks are pre-fetched based on such data as illustrated at step 1509. If queue driver 409 does not employ gap prediction or if usable prediction data is not available for the fetch block in question at step 1507, queue driver 409 fetches the next sequential block(s) of data, as indicated at block 1511.

After fetching/pre-fetching one or more data blocks in the manner shown at steps 1505, 1509, or 1511, entropy encoding module 504 estimates the entropy of the fetched block(s) and encodes the block(s) with the resultant entropy/redundancy signatures, as shown at block 1513. For blocks having previously recorded entropy/redundancy signatures, such as blocks considered at steps 1503 and 1505, the entropy/redundancy may not have to be computed but may be retrieved as part of the blocks' meta data.

Next, as depicted at step 1515, identity function module 519 cross compares entropy and redundancy values of the fetched data blocks with the entropy and redundancy values of presently queued data blocks to check for data matches using an identity function signature. Specifically, identity function module 519 compares the entropy, the absolute redundancy, and the relative redundancy values of the fetched blocks to entropy and redundancy values of presently queued blocks and if a match is found, the fetched blocks are not copied into queue storage 413. Instead, pointers to the extant matching blocks are stored and translated from the LBAs of the fetched blocks in a pointer swizzling process shown at step 1517.

In one embodiment the identify function signature for each block is simply the values of the entropy, the absolute redundancy, and the relative redundancy of each respective data block. In an alternate embodiment, an identity function signature, I, for each respective data block is derived in accordance with the relation: I=H(R)/D/d, where H is the value of entropy, R is the absolute redundancy, and D/d is the relative redundancy. The values of the respective identity function signatures are compared and if equal a match between the blocks is determined.

For the fetched blocks having no data match within queue storage 413, queue driver 409 determines whether, in accordance with the estimated entropy value, the data has exceeded a specified redundancy threshold (step 1408). If not, queue driver 409 stores the fetched blocks as non-compressed data 505 within queue storage 413, as shown at step 1416. If a write miss occurs (step 1412), a block replacement cycle is commenced (step 1414) in association with writing the non-compressed data to queue storage 413. Similar to the embodiment depicted in FIG. 14, the replacement policy may include correlating the entropy signatures of queue blocks in combination with hit recency or frequency to account for similarity between blocks and relative activity as criteria for replacement.

If, as determined at decision step 1408, the fetched data has a redundancy value greater than the specified threshold level, compression module 512 compresses the data as indicated at block 1410 prior to the data being written to queue storage 413. As depicted at step 1420, the entropy encoding for fetched data blocks not previously queued is stored in the block's meta data 511.

Figure 17:
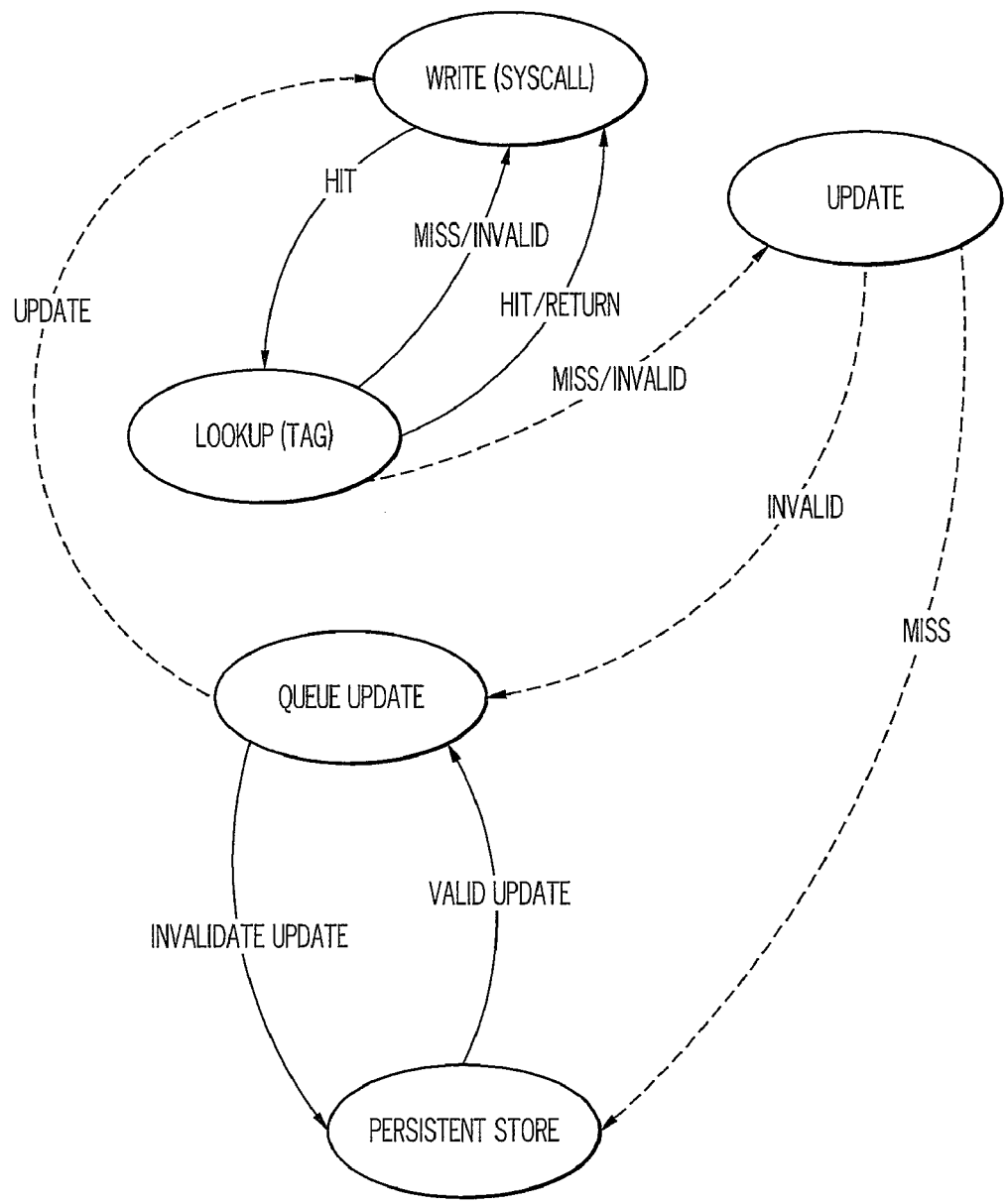
FIG. 17 is a diagram illustrating state transitions for write invalidation according to an embodiment.

FIG. 16 illustrates a modified MSI protocol for maintaining coherency among the I/O queues maintained within VIOCs according to the systems and methods disclosed herein. Caching differs substantially from queuing according to the systems and methods disclosed herein in that caching utilizes different consistency models while queues having an inherent consistency model due to the structure of the queue itself. The resulting enforced serialization simplifies the consistency and does not introduce additional latency or access speed costs. Data in a queue may be allocated, but the disk I/O may not complete in hundreds if not thousands of microseconds. During this time, additional I/O requests could be made against the same allocated data. Accordingly, the states of "committed and valid" and "committed and invalid" are added to the MSI protocol. The state diagram of FIG. 17 illustrates the state transitions for write-invalidation in accord with the present inventive design principles.

As described herein, the VIOC systems communicate with each other on a peer-to-peer basis or are controlled or managed by a VIOC manager (e.g., 709, 807) for purposes of queue utilization optimization. In one embodiment, the size of the queue memory (e.g., 901, 903) is dynamically adjusted, such as on a periodic or continuous basis, based on a set of queue optimization relationships. For the host system, the available amount of memory for queue purposes (HAQ) is based on the amount of the physical memory (PMA), the memory usage of host-based applications (HAMU) the memory usage of the host OS (HOSU), the memory usage of the VMM (VMMU), the number N of simultaneously running VMs, the memory usage of the ith VM OS (VMOSU$_i$), and the memory usage of the applications running on the it VM (VMAMU$_i$) according to the following equation:

$$HAQ = PMA - \left(HAMU + HOSU + VMMU + \left(\sum_{i=1}^{N} VMOSU_i + VMAMU_i\right)\right) \quad (3)$$

The average amount of queue memory space that is efficiently consumed by a VM (AVGQVM is based on the average rate of data I/O transferred into the queue over a given sampling period of each simultaneous VM (AVGIOVM), the average time that data is kept in the queue (AVGTIQ), a queue hit ratio (QHR), which is the number hits divided by the sum of the number of hits and the number of misses, and a queue compression ratio (QCR), which is the compressed size of the data in the queue divided by the original size of the data stored in the queue, according to the following equation (4):

$$AVGQVM = \frac{AVGIOVM \cdot AVGTIQ \cdot QCR}{QHR} \quad (4)$$

A VIOC agent according to the systems and methods disclosed herein "learns" over time and the quality of data in a queue improves. Thus, over time, the queue hit ratio QHR approaches one, and the average rate of data I/O transferred into the queue over a given sampling period of each simultaneous VM AVGIOVM approaches zero. Accordingly, the average amount of queue memory space that is efficiently consumed by a VM AVGQVM becomes smaller over time. Although, the average rate of data I/O transferred into the queue over a given sampling period of each simultaneous VM AVGIOVM approaches zero, the size of the queue cannot be allowed to go to zero. The minimum queue usable allocated to a VM (MINQUVM) is based on AVGQVM according to equation (2) and a queue size factor (SF) according to the following equation (5):

$$MINQUVM = AVGQVM \cdot SF \quad (5)$$

In one embodiment, SF is approximately 1.25, although SF may be any suitable value depending upon the particular configuration; however, MINQUVM cannot be allowed to be less than a certain predetermined minimum. The maximum amount of memory efficiently consumed by a VM (MAXVMM) is based on VM OS usage (VMOSU), VM application usage (VMAU), and optionally VM queue usage (VMQU) according to the following equation (6):

$$MAXVMM = VMOSU + VMAU + VMQU \quad (6)$$

It is noted that if an application normally attempts to store large amounts of data in memory, it may be more efficient in many cases to have the application swap inside of the VM and queue the swap file I/Os as they pass through the VMM to the host queue. It is noted that if the VM queue is not used, then VMQU is zero. If MAXVMM is exceeded, then the queue performance of the host queue is sub-optimal. If AHUQ is less than MINQUVM, then queue performance of the host queue is sub-optimal. In this manner, there exists a "sweet spot" of queue size allocation in which a balance is achieved between the memory allocated to a VM versus the amount of queue usable to perform the necessary queuing of the I/O of the VM.

Queuing at the host level is desirable in many situations as it does not intrude upon the contents of the VM by requiring a VM agent to be installed. This may result, however, in sub-optimal settings being used on the host queue due to lack of insight into the VM. There are alternatives to getting the data through an agent inside the VM. Two alternatives are to look inside of the VM's hard disk(s) and look at what OS is being used and what applications are installed, look at entropy values that are being read/written and comparing them against a known sequence of entropy values, or having someone manually enter the data (or the equivalent of when a VM is provisioned to have the data stored somewhere so that it can be referred to by the queue).

Queuing at the VM level is desirable when there is a need for the host to be free of any additional software installed on it, or if the physical queuing software is not supported on that particular virtualization software or hypervisor configuration. For the VM system, the available amount of memory for queue purposes (VMAQ) is based on the VM memory (VM-MEM), memory usage of VM-based applications (VMAU) and the memory usage of the VM OS (VMOSU) according to the following equation (7):

$$VMAQ = VMMEM - (VMAU + VMOSU) \quad (7)$$

The amount of useable queue (VMUQ) for the VM system is based on VMAQ according to equation (7) and the amount of VM queue in use (VMQIU) according to the following equation (8):

$$VMUQ = VMAQ - VMQIU \quad (8)$$

The maximum amount of efficiently usable queue (MAXEUQ) is based on the average amount of data I/O transferred over a given sampling period (AIO), the average time in queue (ATIQ) a queue hit ratio (QHR) and a queue compression ratio (QCR) according to the following equation (9):

$$MAXQVM = \frac{AIO \cdot ATIQ \cdot QCR}{QHR} \quad (9)$$

The minimal queue usable by a VM (VMMINQU) is based on MAXEUQ according to equation (9) and the queue size factor (SF) according to the following equation (10):

$$VMMINQU = MAXEUQ * SF \quad (10)$$

If a VM application normally tries to put large amounts of data in memory, it may be more efficient in many cases to have it swap memory to disk and have the queue monitor the swap file I/Os.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the systems and methods disclosed herein may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Although the systems and methods disclosed herein has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the systems and methods disclosed herein without departing from the spirit and scope of the invention as defined by the appended claims.

What is claimed is:

1. A computer network comprising:
a network;
a first host system coupled to said network, said first host system comprising a host machine and a virtual machine installed on said host machine;
a second host system coupled to said network, said second host system comprising a host machine and a virtual machine installed on said host machine; and
a virtual input/output channel (VIOC) system associated with at least one of said first and second host systems, said VIOC system comprising virtual I/O channels (VIOCs) and a VIOC agent, said VIOCs including multiple, variable size I/O data queues from which I/O requests generated by said virtual machines may be serviced, and wherein said VIOC agent is configured to adaptively manage I/O data queues within said VIOCs.

2. The computer network of claim 1, wherein said I/O data queues comprise double linked lists.

3. The computer network of claim 1, wherein said VIOC agent is configured to adaptively adjust the size of the said I/O data queues.

4. The computer network of claim 1, wherein said VIOCs include a queue driver configured to encode data stored in said I/O data queues.

5. The computer network of claim 1, wherein said VIOC system includes:
a first VIOC system associated with said first host system, said first VIOC system comprising VIOCs and a VIOC agent; and
a second VIOC system associated with said second host system, said second VIOC system comprising VIOCs and a VIOC agent.

6. The computer network of claim 5, further comprising a VIOC manager coupled to said network to control operation of said VIOCs included within said first and second VIOC systems.

7. The computer network of claim 1, wherein said VIOC system includes a host VIOC system associated with at least one of said host machines of first or second host systems.

8. The computer network of claim 1, wherein said VIOC system includes a virtual machine VIOC system associated with at least one of said virtual machines of said first or second host systems.

9. A method for processing input/output (I/O) requests in a computer network, said method comprising:
providing a first host system coupled to said network, said first host system comprising a host machine and a virtual machine installed on said host machine;
providing a second host system coupled to said network, said second host system comprising a host machine and a virtual machine installed on said host machine; and
processing I/O requests using a virtual input/output channel (VIOC) system associated with at least one of said first and second host systems, said VIOC system comprising virtual I/O channels (VIOCs) and a VIOC agent, said VIOCs including multiple, variable size I/O data queues from which I/O requests generated by said virtual machines may be serviced, and wherein said VIOC agent is configured to adaptively manage I/O data queues within said VIOCs.

10. The method of claim 9, wherein said I/O data queues comprise double linked lists.

11. The method of claim 9, wherein said VIOC agent is configured to adaptively adjust the size of the said I/O data queues.

12. The method of claim 9, wherein said VIOCs include a queue driver configured to encode data stored in said I/O data queues.

13. The method of claim 9, wherein said VIOC system includes:
a first VIOC system associated with said first host system, said first VIOC system comprising VIOCs and a VIOC agent; and
a second VIOC system associated with said second host system, said second VIOC system comprising VIOCs and a VIOC agent.

14. The method of claim 13, further comprising providing a VIOC manager coupled to said network to control operation of said VIOCs included within said first and second VIOC systems.

15. The method of claim 9, wherein said VIOC system includes a host VIOC system associated with at least one of said host machines of first or second host systems.

16. The method of claim 9, wherein said VIOC system includes a virtual machine VIOC system associated with at least one of said virtual machines of said first or second host systems.

17. The method of claim 9, wherein said VIOC agent is configured to adaptively manage said I/O data queues in accordance with I/O data patterns.

18. The method of claim 9, wherein said VIOC agent determines prioritization for queuing data within said I/O queues adaptively or based on manual data entry.

19. The method of claim 9, wherein said VIOC agent determines a type and mode of virtual hard disk utilized for an I/O request and determines whether to commit writes to disk in accordance with the determined type and mode of virtual hard disk.

20. The method of claim 9, wherein said VIOC agent determines whether to commit writes to disk responsive to a system reboot based on state states of said virtual machine.

* * * * *